Feb. 20, 1934.  B. T. HEADLEY ET AL  1,948,218
GLASS WORKING MACHINE
Original Filed Jan. 27, 1914   15 Sheets-Sheet 1

Inventors.—
Benjamin T. Headley.
Parke H. Thompson.
by their Attorneys:—

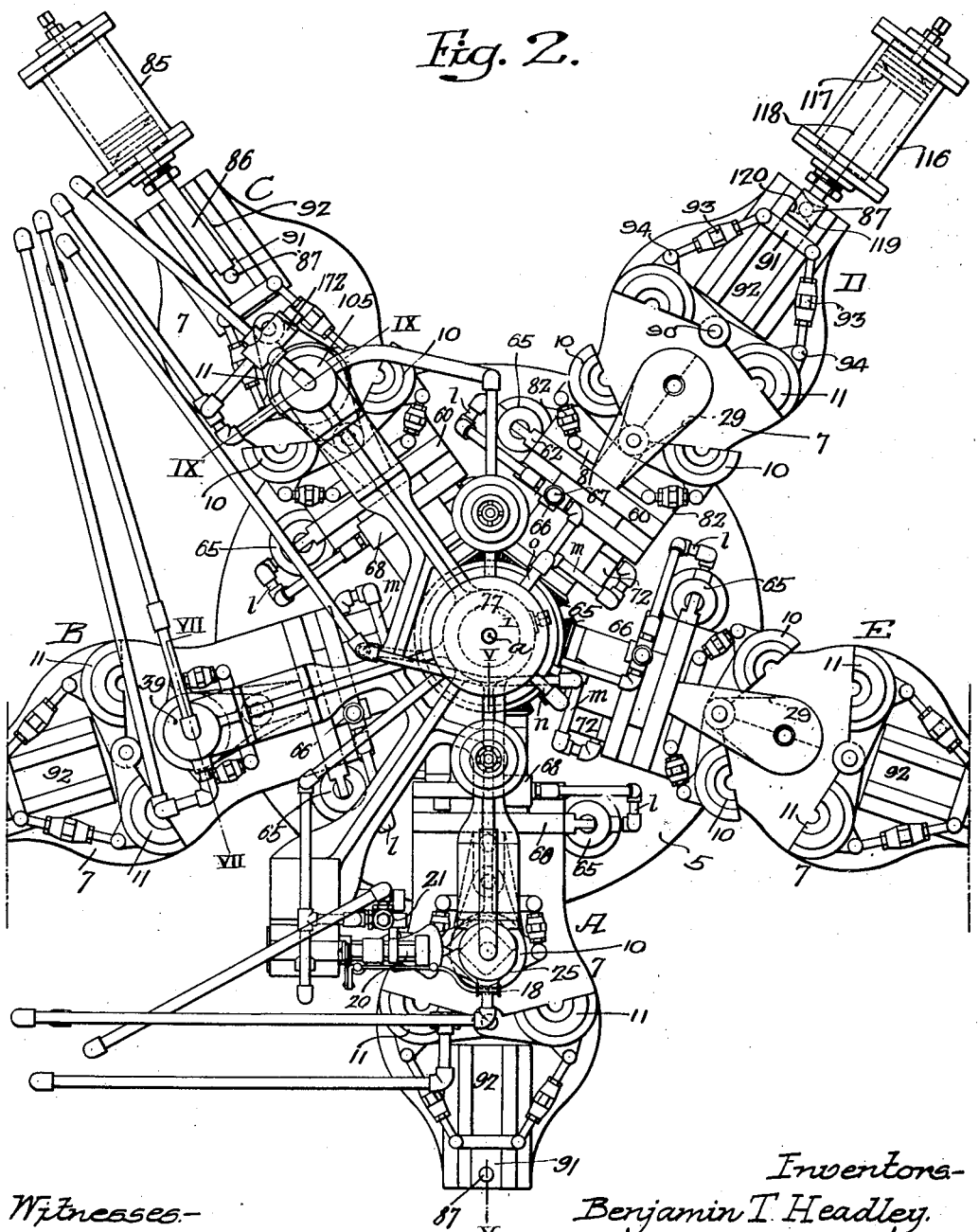

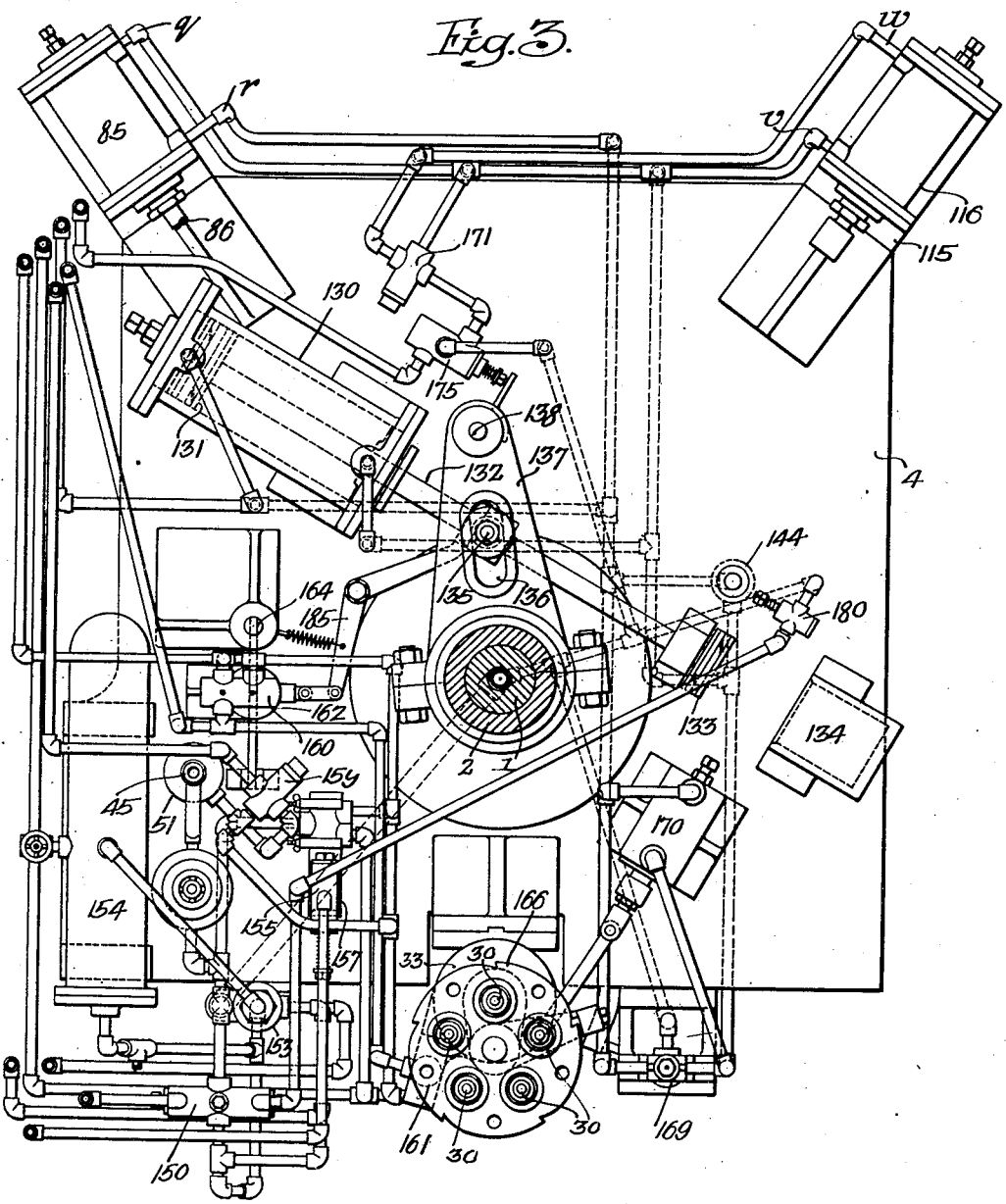

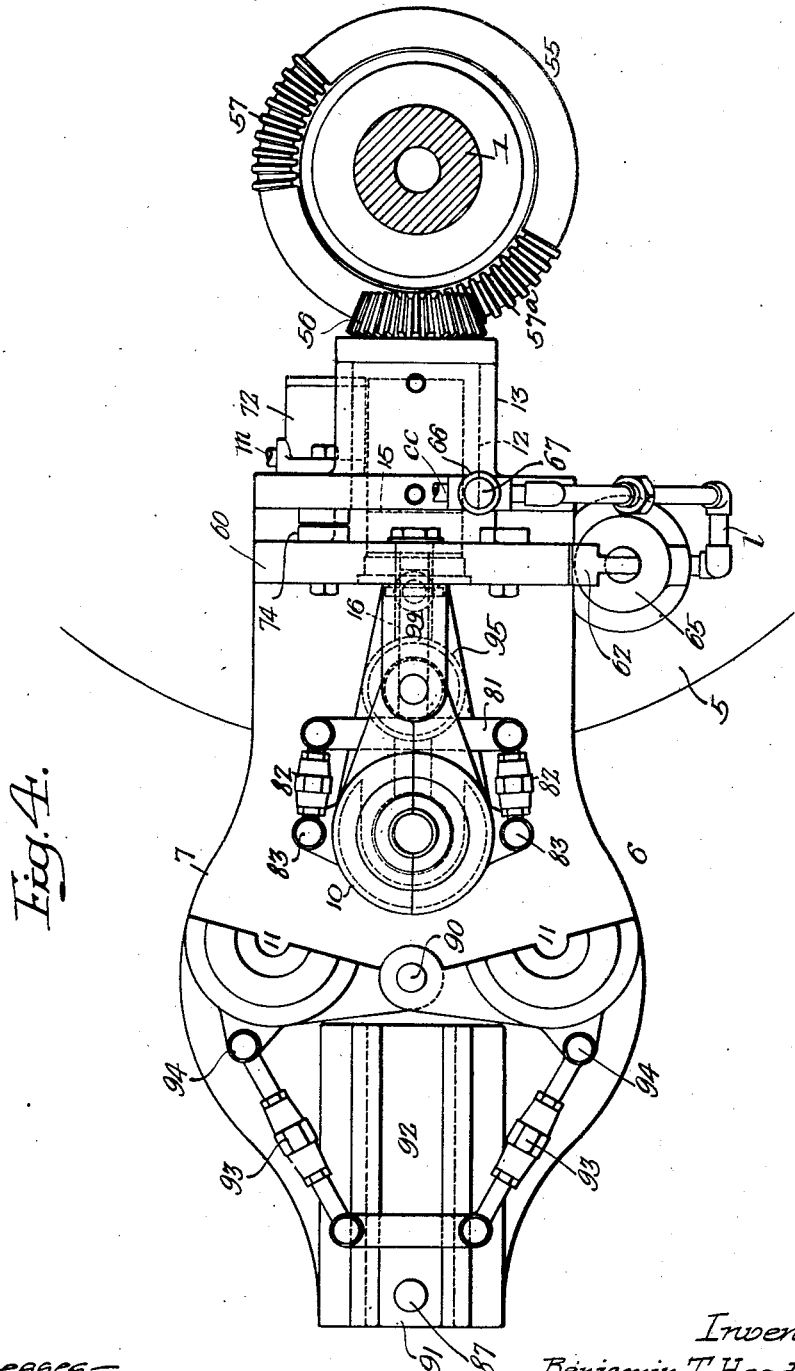

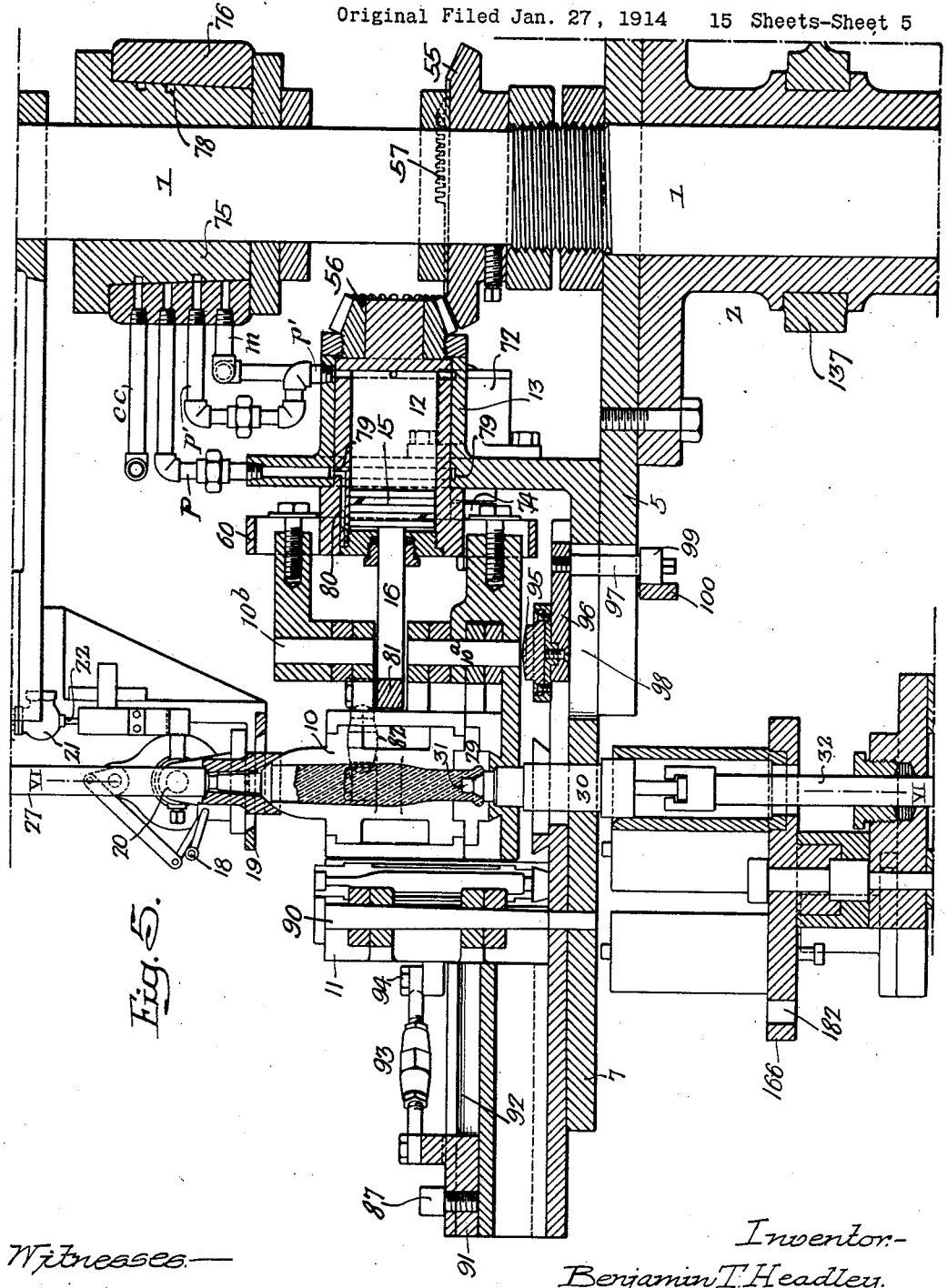

Feb. 20, 1934.  B. T. HEADLEY ET AL  1,948,218
GLASS WORKING MACHINE
Original Filed Jan. 27, 1914    15 Sheets-Sheet 6
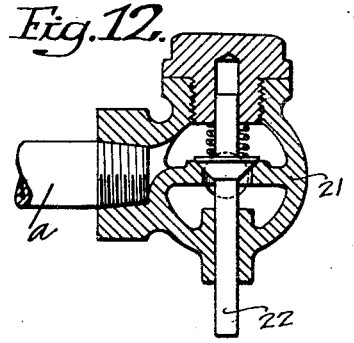
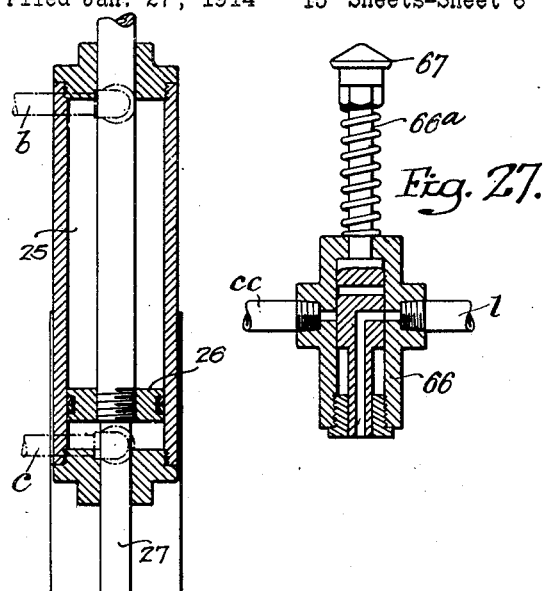
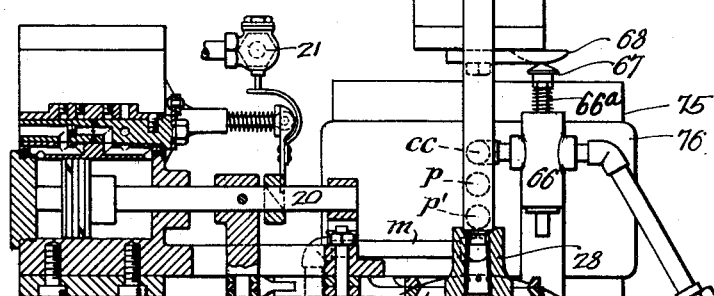
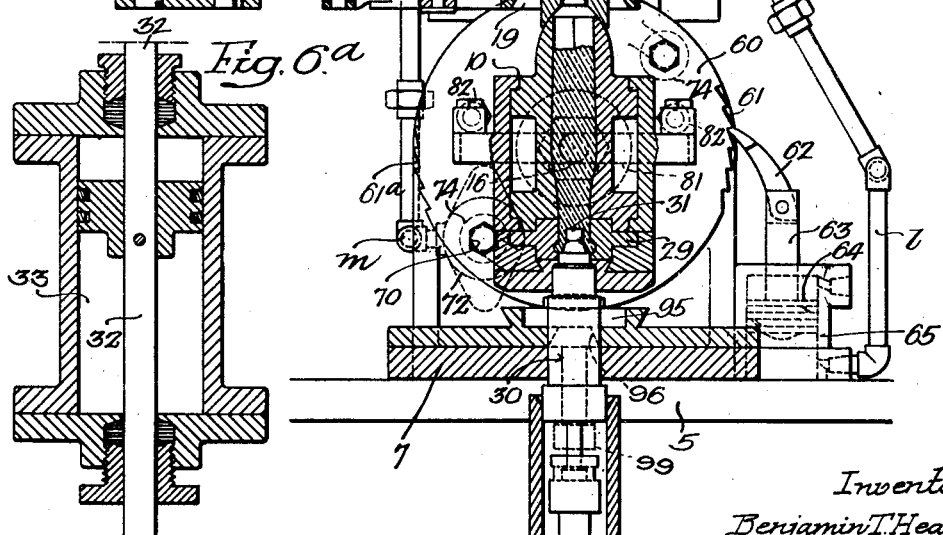
Witnesses:
Inventors:-
Benjamin T. Headley.
Parke H. Thompson.
by their Attorneys-
Howson & Howson

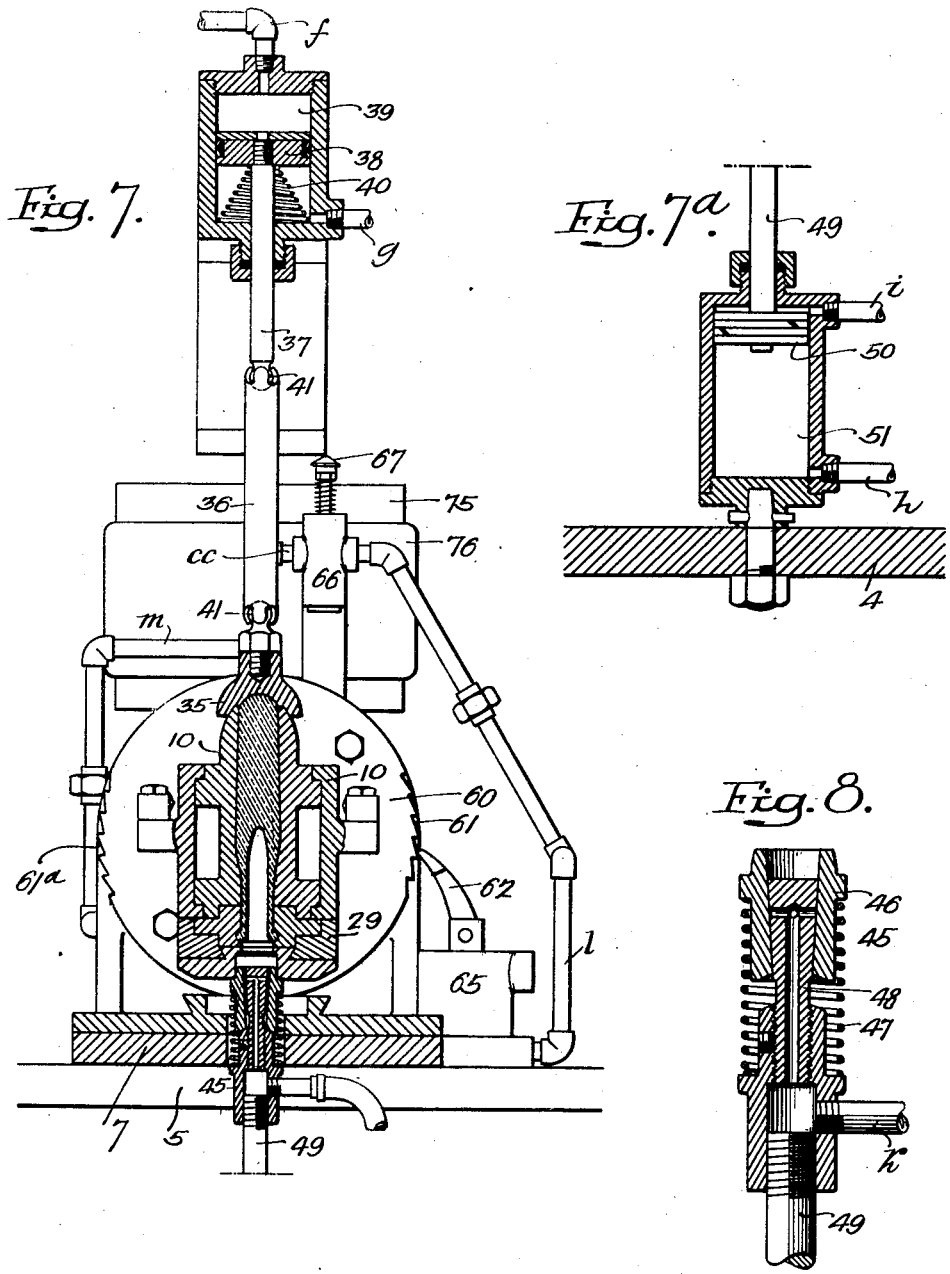

Feb. 20, 1934.   B. T. HEADLEY ET AL   1,948,218
GLASS WORKING MACHINE
Original Filed Jan. 27, 1914   15 Sheets-Sheet 8
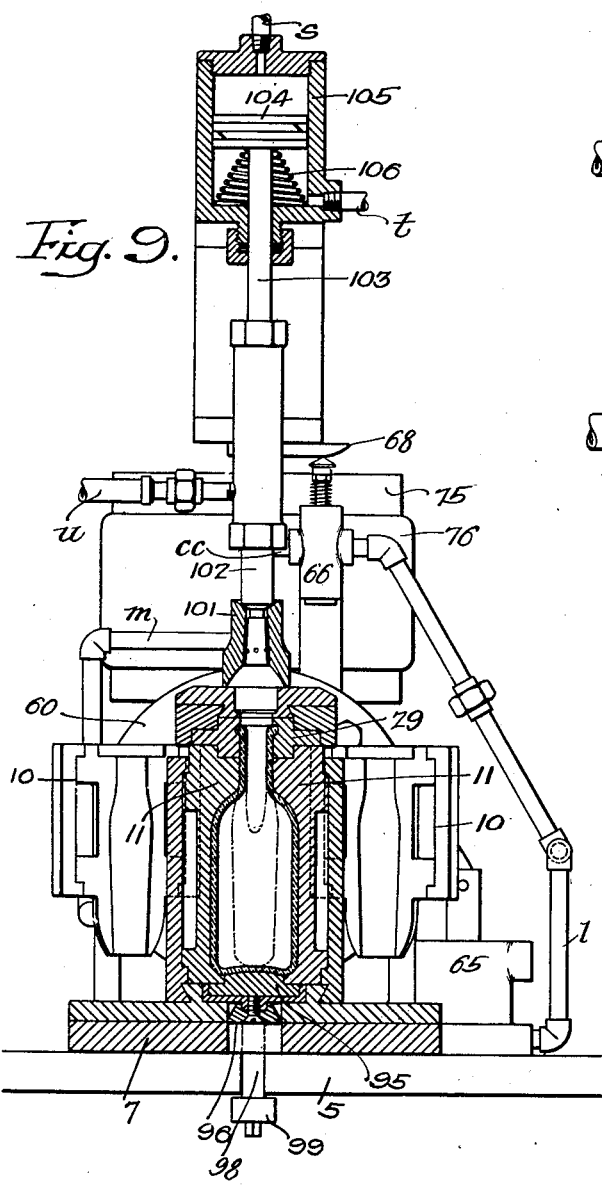
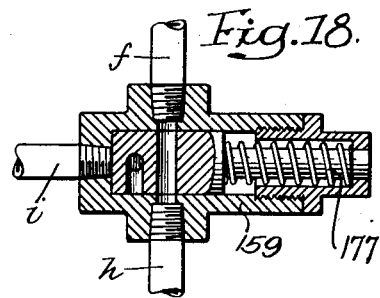
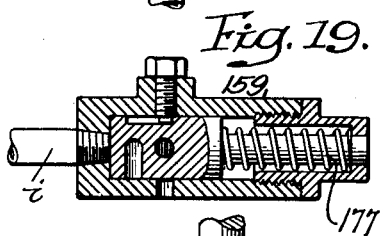
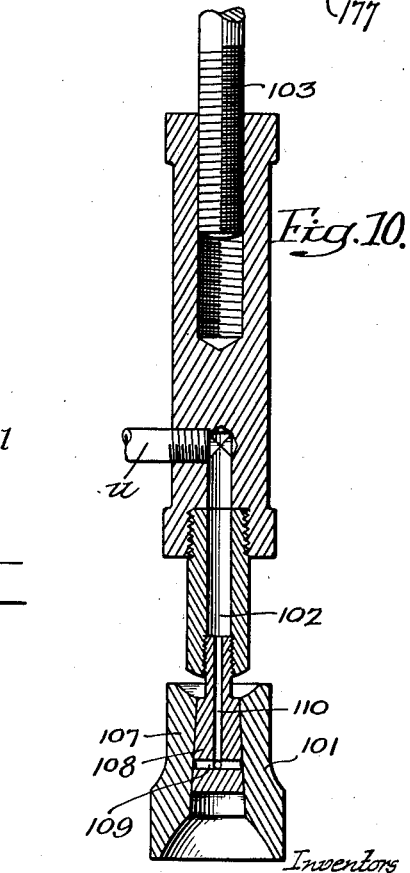
Inventors
Benjamin T. Headley.
Parke H. Thompson.
by their Attorneys
Howson & Howson Feb. 20, 1934.    B. T. HEADLEY ET AL    1,948,218
GLASS WORKING MACHINE
Original Filed Jan. 27, 1914    15 Sheets-Sheet 9

Inventors:-
Benjamin T. Headley.
Parke H. Thompson.
by their Attorneys.—
Howson & Howson Witnesses:-

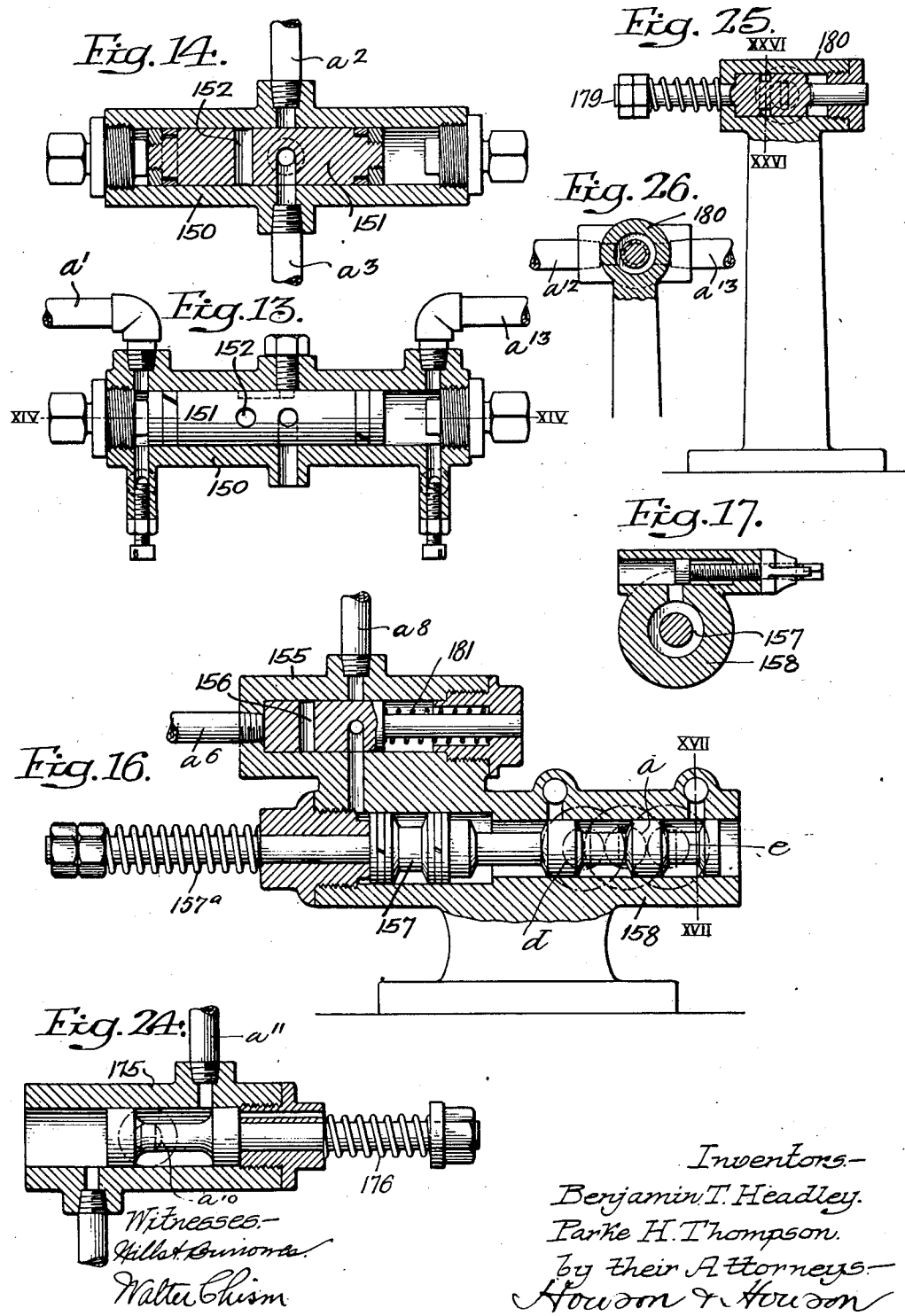

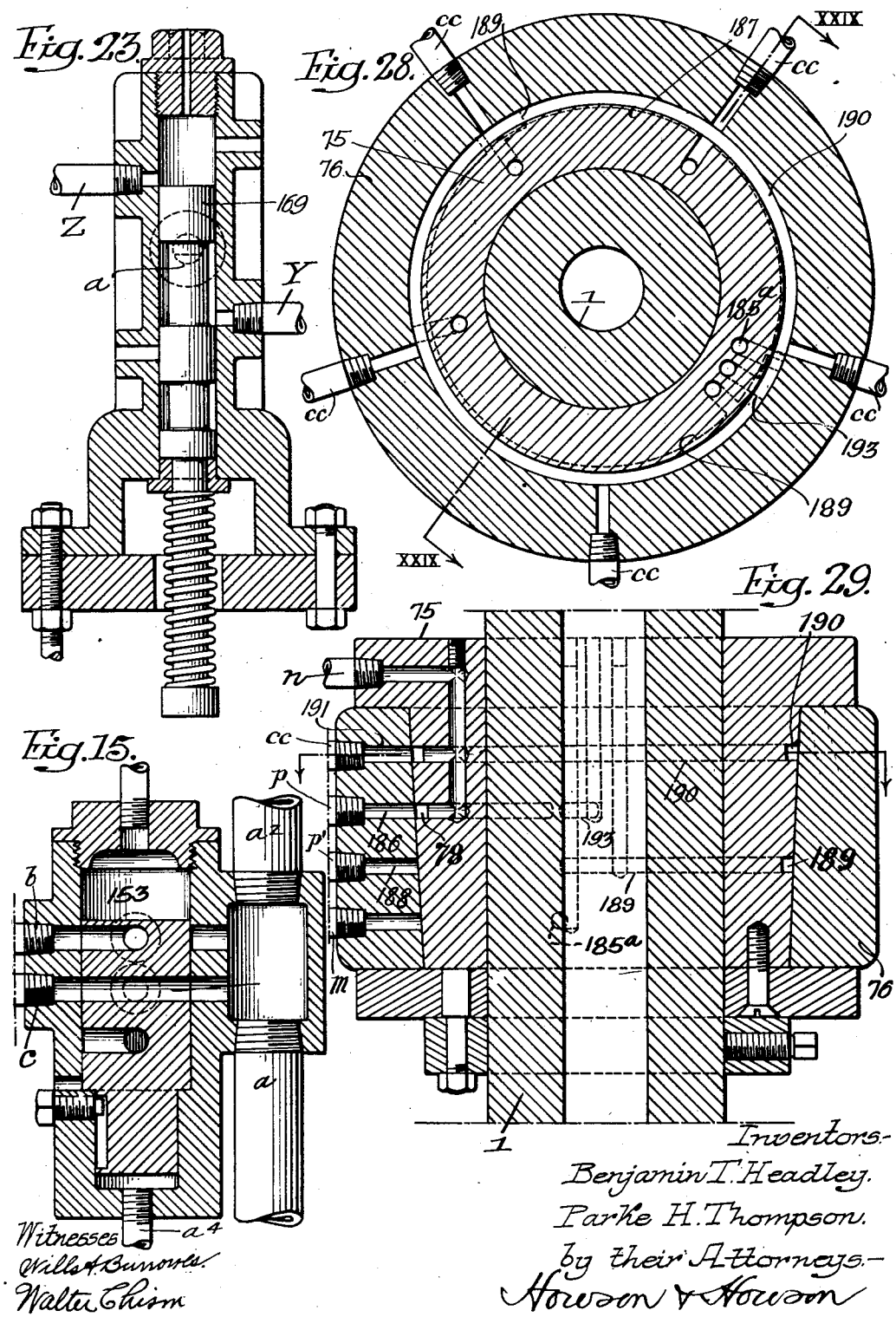

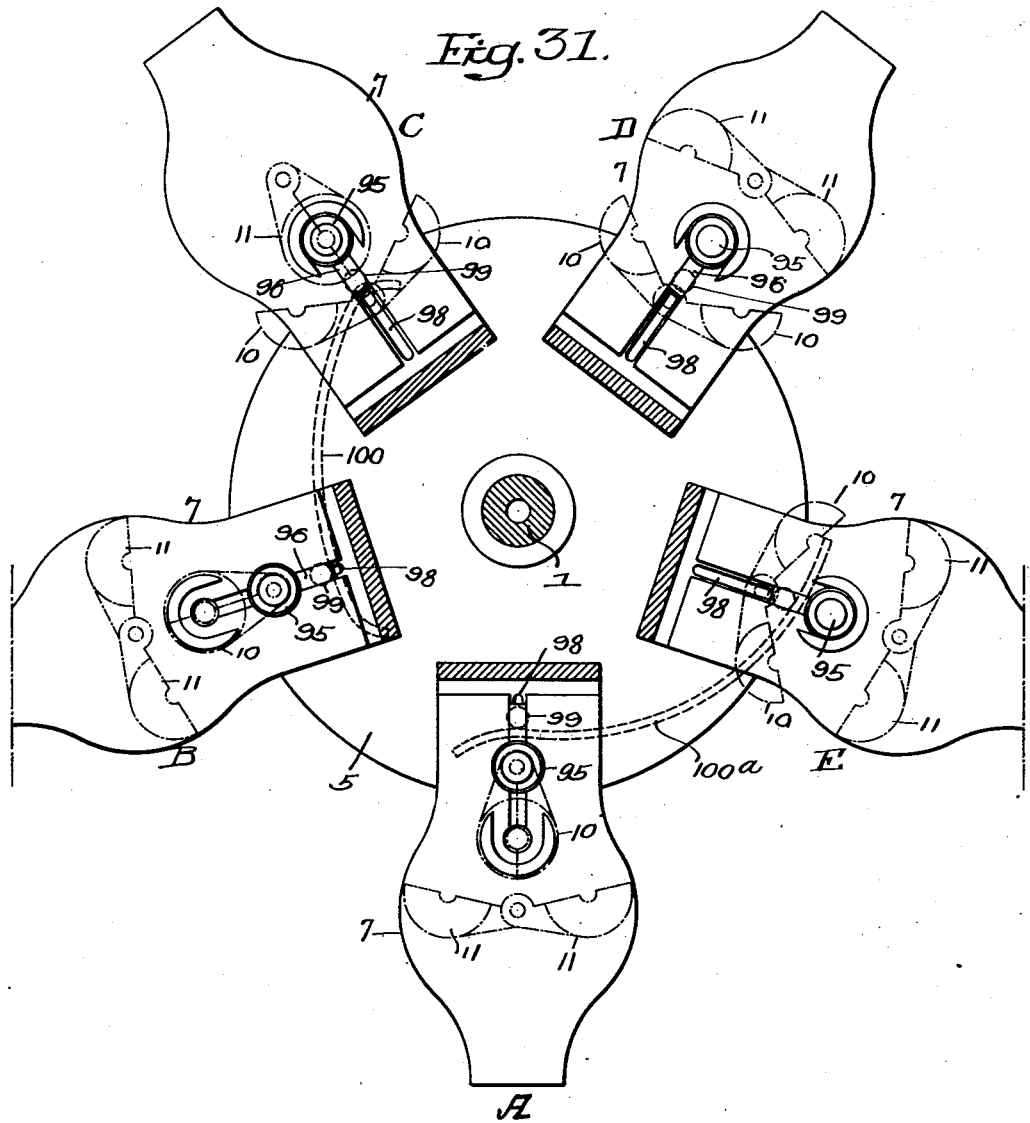

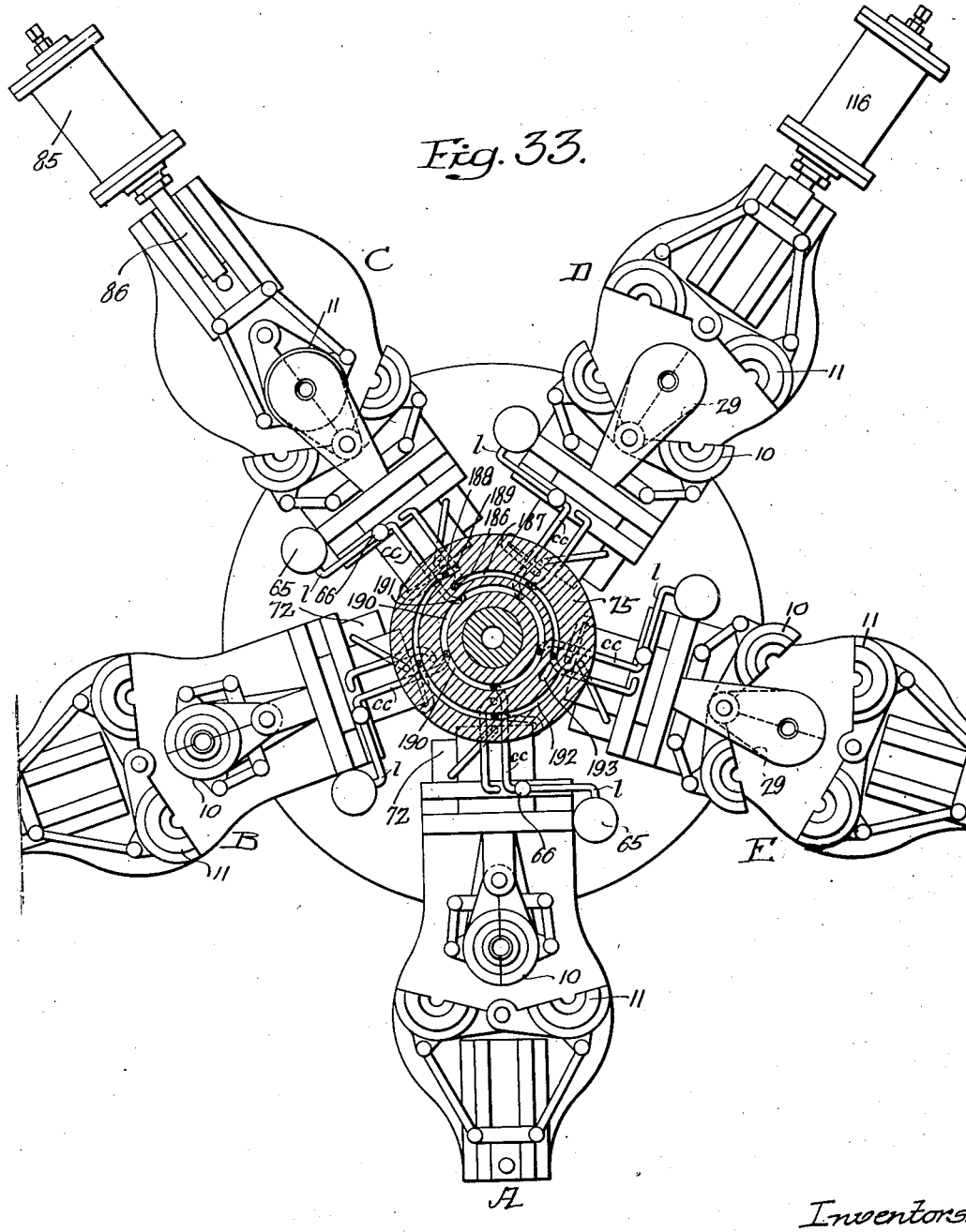

Patented Feb. 20, 1934

1,948,218

UNITED STATES PATENT OFFICE 1,948,218

GLASS WORKING MACHINE

Benjamin T. Headley and Parke H. Thompson, Millville, N. J., assignors, by mesne assignments, to Hartford-Empire Company, Hartford, Conn., a corporation of Delaware Continuation of application Serial No. 814,728, January 27, 1914. This application October 25, 1915. Serial No. 57,800½

55 Claims. (Cl. 49—5)

Our invention relates to machines employed for making articles of hollow glassware, bottles and the like; and the object of our invention is to provide certain improvements in that class of machines in which the several operations are automatically performed successively from the time a charge of glass introduced into a blank-mold has been cut from the gathering rod until the finished bottle is removed from a blow-mold.

In our present machine, we have employed certain features shown in Patent No. 1,017,870, and the present machine has some resemblance to the machine of the patent, in that it is started by the gathering boy or operator pressing a lever which controls cutting mechanism performing the initial operation upon the glass, which operation, in the present invention, is immediately followed by the delivery of air to force the charge of glass into one end of a blank-mold having a suitable neck-mold structure combined therewith and surrounding a mouth forming pin whereby a finished mouth and neck is imparted to the blank or parison.

These and other features of our invention will be more fully described hereinafter, reference being had to the accompanying drawings, in which:

Fig. 2 is a plan view of the same;

Fig. 3 is a plan view, partly in section, on the line III—III, Fig. 1;

Fig. 4 is a plan view of a portion of the structure shown in Fig. 2, on a larger scale;

Fig. 5 is a sectional view on the line V—V, Fig. 2, on a larger scale;

Fig. 6 is a sectional view on the line VI—VI, Fig. 5;

Figure 1:
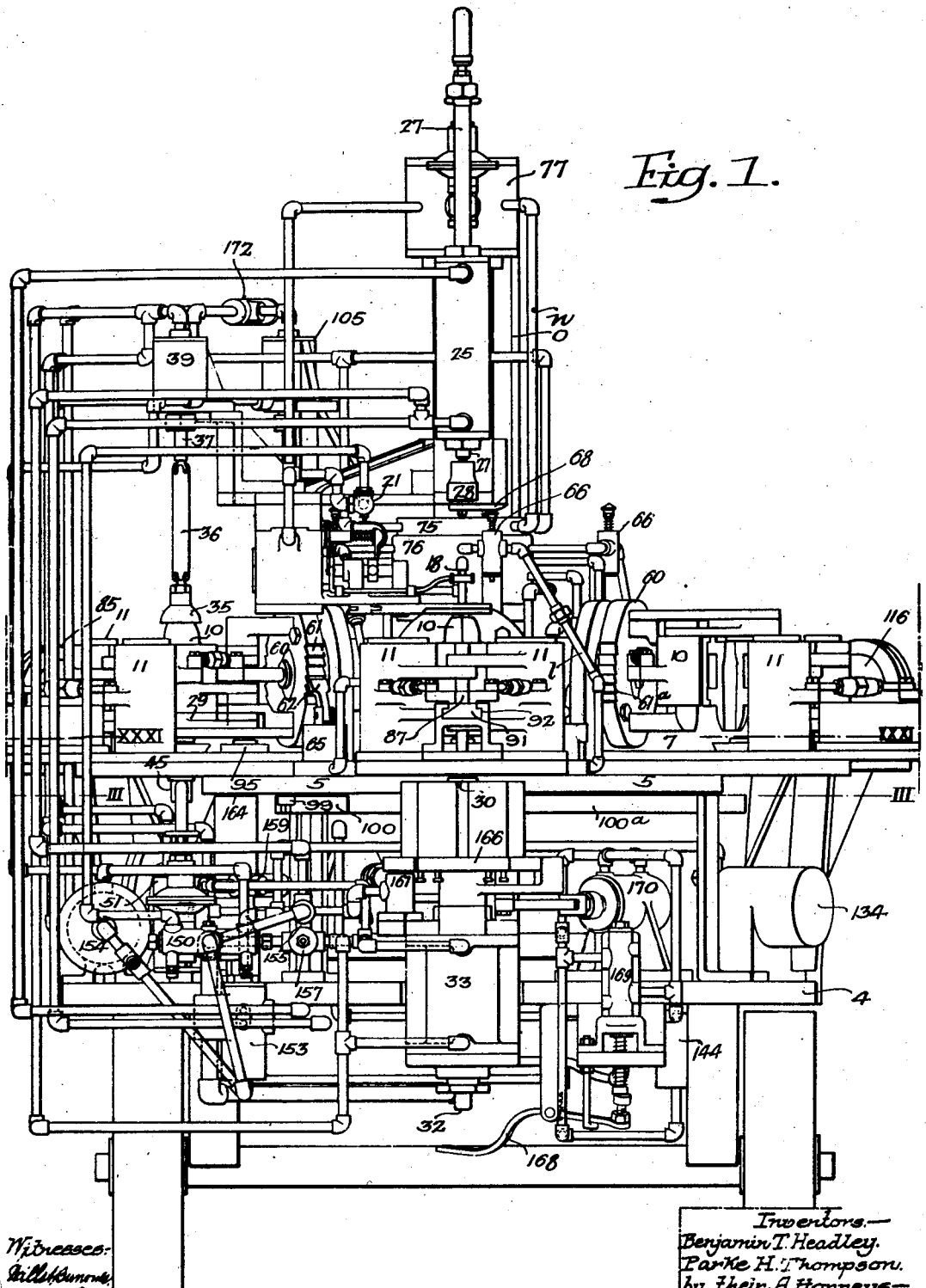
Figure 1 is a front elevation of a glass working machine embodying our invention.
Figure 11:
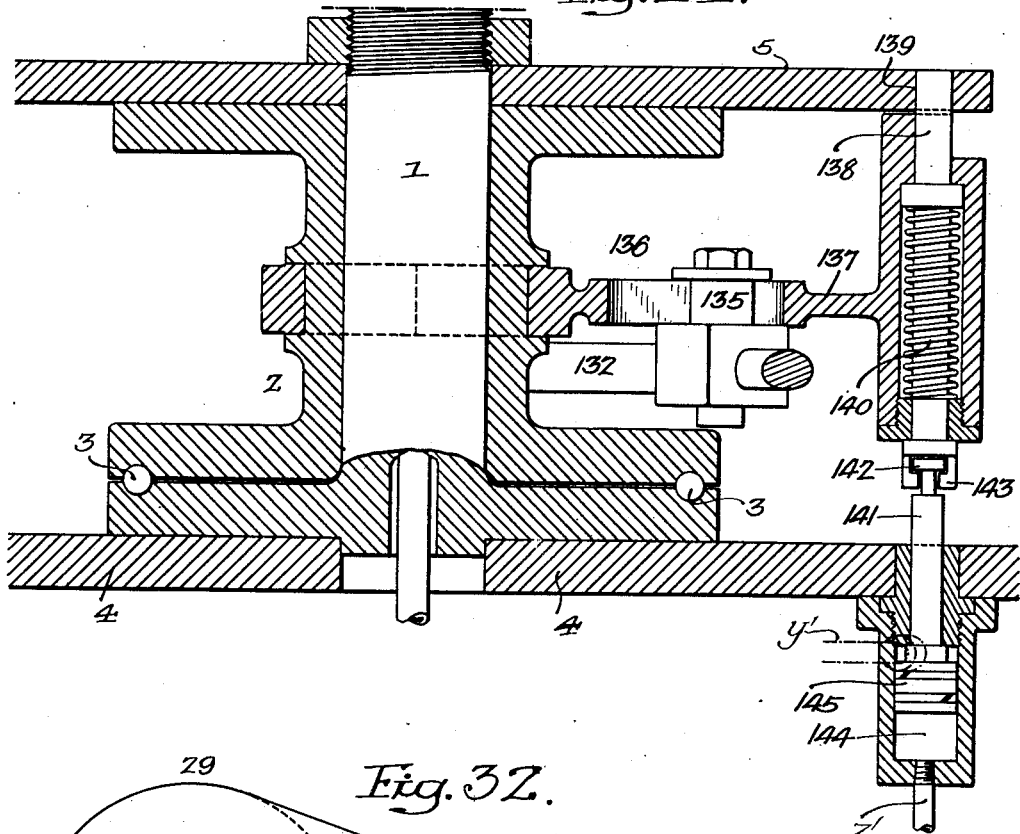
Figure 32:
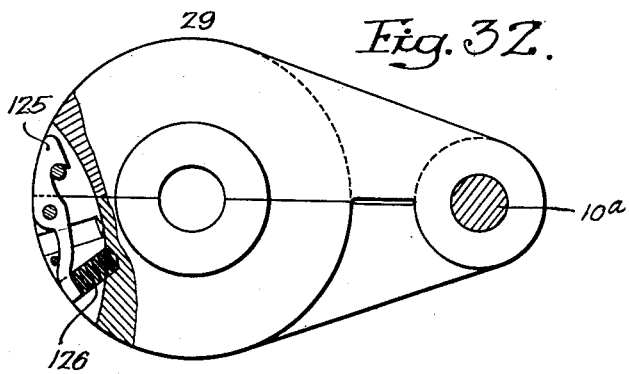
Figure 21:
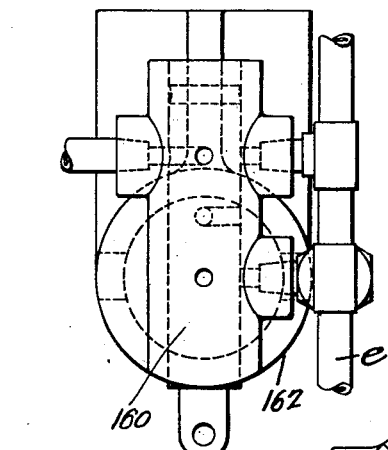
Figure 20:
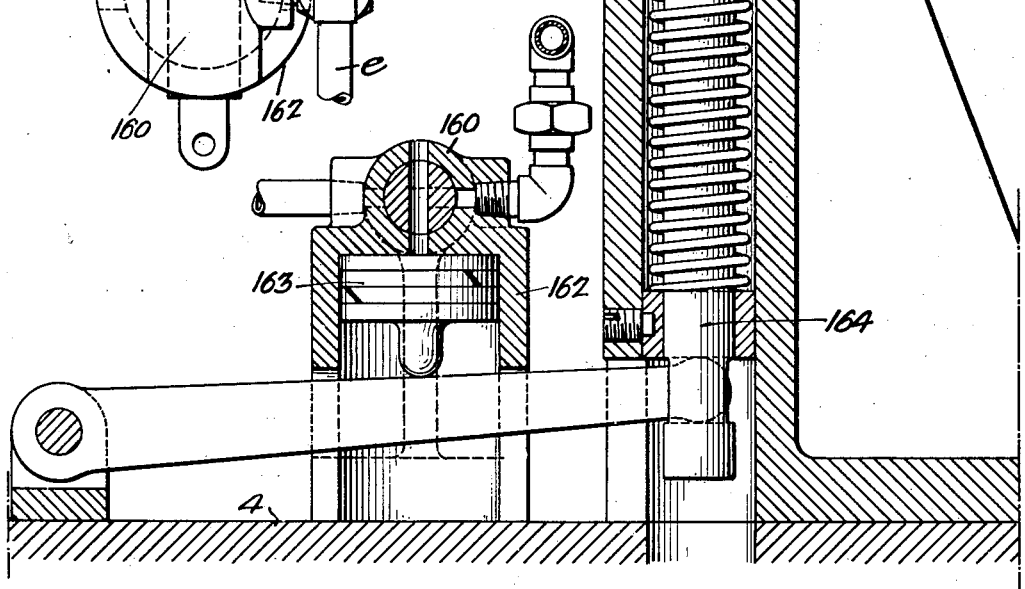
Figure 22:
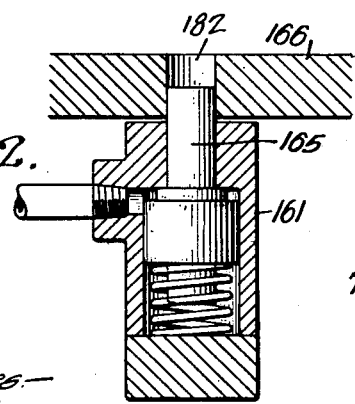
Figure 30:
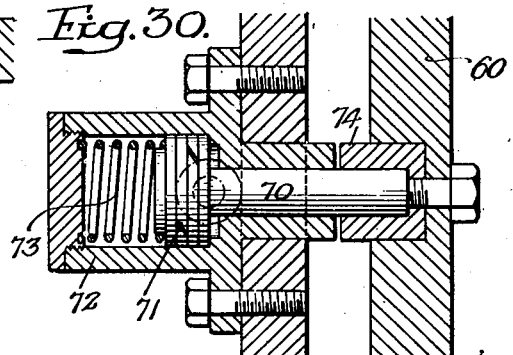
Figure 34:
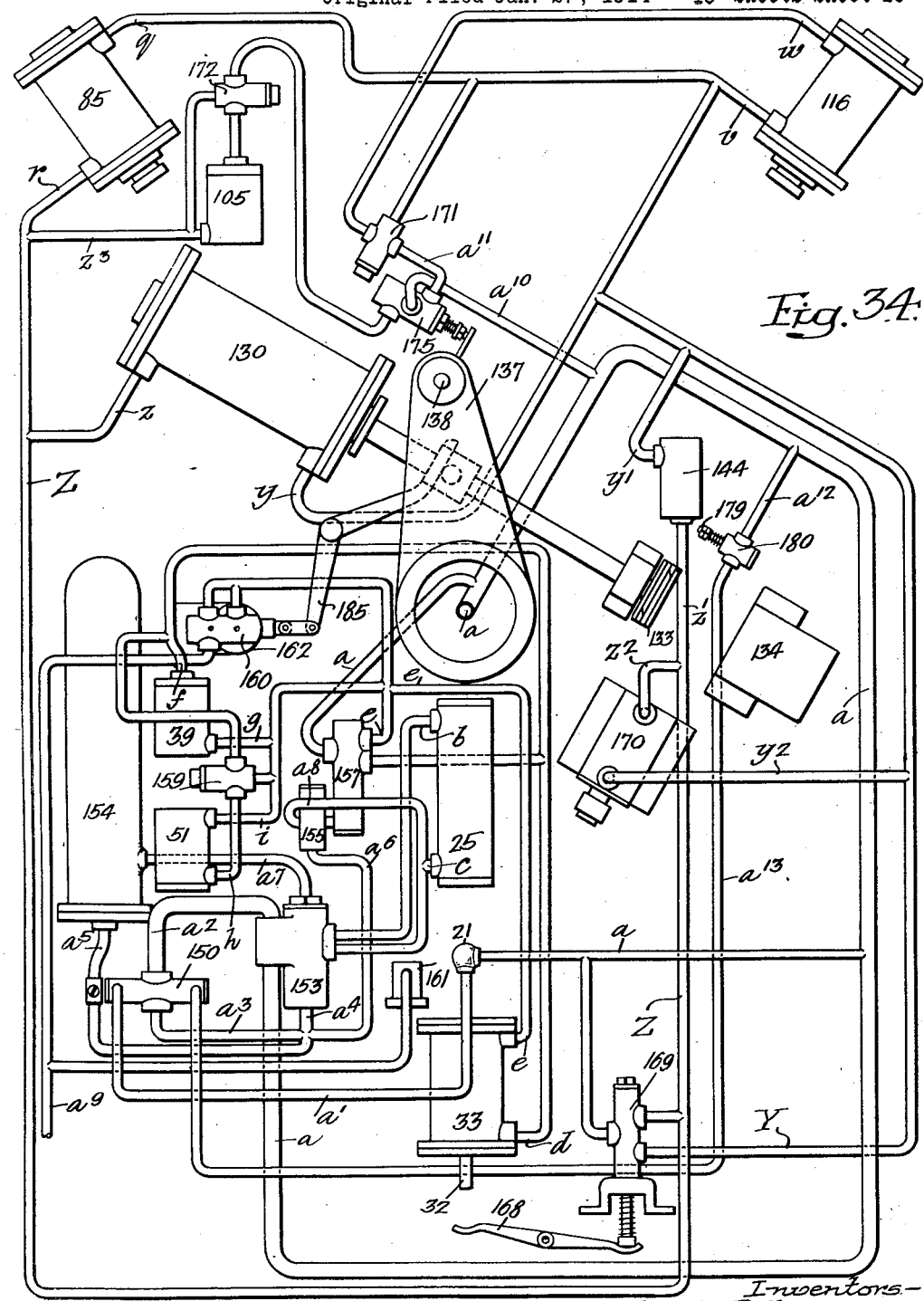

Fig. 6ª is a view of the lower portion of the structure illustrated in Fig. 5;

Fig. 7 is a sectional view on the line VII—VII, Fig. 2, on a larger scale;

Fig. 7ª is a view of the lower portion of the structure illustrated in Fig. 7;

Fig. 8 is a sectional view of the blow-head shown in Fig. 7, on a larger scale;

Fig. 9 is a sectional vew on the line IX—IX, Fig. 2;

Fig. 10 is a sectional view of the blow-head and carrier shown in Fig. 9, on a larger scale;

Fig. 11 is a sectional view of the main table support showing part of the operating mechanism therefor;

Fig. 12 is a sectional view of the main controlling valve;

Fig. 13 is a sectional view of the valve controlling the passage of air to the equalizing valve;

Fig. 14 is a sectional view on the line XIV—XIV, Fig. 13;

Fig. 15 is a sectional view of the equalizing valve for controlling the amount of air passing to the upper side of the cylinder disposed over the blank-mold;

Fig. 16 is a view of the valve controlling the mouth forming pin and the blow-head admitting air to the mass of glass in the blank-mold to force around said pin;

Fig. 17 is a sectional view on the line XVII—XVII, Fig. 16;

Figs. 18 and 19 are sectional views of an exhaust valve, of which several are used in the machine;

Fig. 20 is a sectional view of the locking means for the mold-carrying table and the means for operating the same;

Fig. 21 is a plan view of the cylinder and valve of the lock controlling means;

Fig. 22 is a sectional view of locking means for the table carrying the mouth forming pins;

Fig. 23 is a sectional view of the valve controlling the opening and closing of the blow-molds;

Fig. 24 is a sectional view of the valve controlling the lowering of the blow-head over the blow-mold;

Fig. 25 is a sectional view of a valve controlling the return of the machine to normal position;

Fig. 26 is a sectional view on the line XXVI—XXVI, Fig. 25;

Fig. 27 is a sectional view of one of the valves employed in positioning the blank-mold;

Fig. 28 is a plan view of the valve controlling the opening and closing of the blank-molds;

Fig. 29 is a sectional view of said valve on the line XXIX—XXIX, Fig. 28;

Fig. 30 is a sectional view of locking means for the heads carrying the blank-molds;

Fig. 31 is a sectional view on the line XXXI—XXXI, Fig. 1, showing the mold bottoms and their carriers;

Fig. 32 is a sectional view of a neck-mold;

Fig. 33 is a plan view, partly in section, illustrating the several molds in the successive positions occupied by the same in the operation of the machine, and Fig. 34 is a diagrammatic plan view of the cylinders, valve structures, and the pipes conveying air to said several cylinders and valve structures for carrying on the various operations of the machine.

The improved machine forming the subject of our invention comprises in general a central hollow standard 1, carrying a pedestal 2, supported by a ball-bearing 3, mounted upon a relatively fixed table 4, which table is suitably supported by a series of wheels so as to be capable of transfer, as may be desired, to any portion of a shop.

The pedestal 2 carries a rotatable table 5 upon which is mounted a plurality of sets of mold structures 6; in the present instance five in number, which sets of mold structures are identical in construction and mode of operation, and hence reference will be made to one set only of the same.

Each of these sets of mold structures includes a plate 7 supported by the table 5 and movable therewith in a circular path to various points, which may be equidistant from each other and constitute the several stations in the production of hollow glassware by the mechanism forming the subject of our invention. The plate 7 carries a sectional blank-mold 10 and a sectional blow-mold 11. The sections of the blank-mold are journaled on pins 10$^a$ and 10$^b$ in axial alignment, carried by a rotatable sleeve 12, journaled in a bracket 13 mounted on the plate 7, and this mold is arranged to be rotated by suitable mechanism, hereinafter described, whereby the mold may be presented with its bottom upwardly disposed for the reception of a charge of glass, which is first forced into the lower portion of said mold around a mouth-forming pin and within a neck-mold operatively combined with said blank-mold, subsequently shifted horizontally to a second position so as to present its upper end, still in the lowered position, to a blow-head designed to enlarge the opening in the neck end of the charge of glass, and finally reversed to bring the neck-mold uppermost so that the blank may be transferred to a blow-mold.

In addition, the sections of the blank-mold may be swung horizontally to open and close the same; the sleeve 12 journaled in the bracket 13 constituting a cylinder receiving a piston 15 having a piston rod 16, to the outer end of which the sections of said mold are attached, and by means of which connection and the proper application of air to said cylinder such mold may be moved to or withdrawn from the charging position, as hereinafter described.

As shown in Figs. 4 and 5, the blank-mold is in the charging position, ready to receive the glass, and after the mold has been charged, the operator rests his gathering rod upon a lever 18 of glass shearing mechanism substantially like that disclosed in Patent No. 1,017,870, of February 20, 1912, including shears 19 which operate to cut the charge of glass from the gather in the manner set forth in said patent. It will be apparent that the lever 18 operates the valve 18$^a$ through the linkage 18$^b$, and that the valve 18$^a$ controls the supply of actuating fluid to the cylinder 20$^a$ which operates the piston rod 20 for moving the shears. The return of a piston rod 20, effecting the opening of the shears for a fresh operation, automatically trips a valve 21, (shown in Fig. 12,) by engagement with its stem 22, which valve controls the main supply of air entering via a pipe $a$.

Above the blank-mold is a cylinder 25, having a piston 26 carried by a hollow piston-rod 27 having at its lower end a blow-head 28. The blow-head is lowered and raised by air entering said cylinder through pipes $b$ and $c$. The hollow piston-rod receives air from a suitable source, which is introduced into said blank-mold for the purpose of forcing the glass in the same into a supplemental neck-mold 29 operatively connected with said blank-mold; a plug 30 from beneath the table 5 having been previously introduced into said neck-mold and forming a closure for the end of the same; said plug having a central mouth forming pin 31 whereby an initial recess is formed in the blank into which a charge of air is subsequently delivered, when said blank-mold is shifted to the second position, to enlarge said opening and cause the glass to fill said blank-mold.

Prior to shifting the blank-mold, the plug 30 is withdrawn, said plug being operatively connected to the end of a piston-rod 32 controlled by a piston in a cylinder 33, to which air is admitted for the operation thereof through pipes $d$ and $e$. This constitutes a fluid pressure actuated device for forming a neck in the blank.

The glass is charged into the blank-mold when the latter is at position A, and the central cavity or mouth of the neck is formed at this point. The table 5 is then moved to bring the blank-mold to position B. When in this position, a cap 35 is lowered onto the bottom of the blank-mold; the latter being still inverted, said cap being carried by a link 36 attached to a piston-rod 37, having a piston 38 mounted in a cylinder 39, which piston may be lowered to hold said cap in place by air admitted from a pipe $f$, and raised by air admitted to the cylinder through a pipe $g$, a spring 40 being also employed to assist in holding said piston in the elevated position. The link 36 may be connected to the cap 35 and the piston-rod 37 by ball and socket joints 41.

Below the blank-mold 10, a blow-head 45 is positioned, such blow-head comprising a sleeve 46 supported in the closed position by a spring 47, and surrounding a suitably apertured stem 48 carried by a piston-rod 49, having an operating piston 50 mounted in a cylinder 51, to which air is admitted for the operation of said piston via pipes $h$ and $i$. Connected to the upper end of the piston-rod is a pipe $k$ through which air is admitted for passage through said blow-head to enlarge the central recess formed in the neck end of the mass of glass and force the latter into the blank-mold. As soon as this operation is concluded, the blow-head is lowered and the cap is withdrawn, and then the blank-mold is moved to the third position C.

During this movement the position of the blank-mold is shifted so as to bring the neck-end uppermost. This is accomplished in the following manner: Mounted on the pedestal 1 is a mutilated bevel gear wheel 55, held in fixed position. Carried by the end of the sleeve 12, is a bevel pinion 56 arranged to mesh with the two sections of teeth 57 and 57$^a$ on said gear wheel 55, forming racks, and when the blank-mold starts to move to the third position, said pinion 56 comes into contact with the toothed section 57 and is moved thereby to rotate said sleeve 12 and shift the blank-mold. This action may not effect complete perpendicular positioning of the blank-mold, and to insure such position, we provide a circular plate 60, carried by the sleeve 12, having two sets of ratchet teeth 61 and 61$^a$. A pawl 62 is disposed in engagement with the teeth 61$^a$, which pawl is carried by a piston 63 having an operating piston head 64, mounted in a cylinder 65. Air is admitted to said cylinder to raise the piston from a pipe $l$; such admission being controlled by a valve 66, having a stem 66$^a$ with a head 67 which is actuated by a cam plate 68 carried by the frame of the machine and positioned to engage said valve 66, carried by the table 5 with the blank-mold, as said table approaches the limit of its partial movement to bring the blank-mold with the blank to the blowing position. When the plate 60 is at rest with the blank-mold in vertical position, said plate is locked by a pin 70, carried by a piston 71 mounted in a cylinder 72, said pin being moved to the locking position by a spring 73 within said cylinder. The pin is released by air admitted from a pipe $m$ to act upon said piston against the action of the spring. The plate 60 preferably carries a pair of bushings 74 forming sockets for the reception of said pin in the two positions in which said plate 60 is placed.

Carried by the standard 1 of the machine is a rotary valve which comprises a collar or sleeve 75, suitably fixed to said standard, and a movable portion 76, operatively connected to the rotating table 5. The fixed sleeve and rotary portion of said valve are provided with a series of passages, some of which are vertically disposed while others are annularly disposed; the latter being formed in the collar or sleeve 75. Air is admitted to the fixed member through pipes $n$ and $o$ leading from a main air drum 77 mounted on top of the standard 1.

The pressure of motive fluid is constant in the pipes $n$ and $o$; being cut off at intervals by the movement of the rotary portion of the valve. When it is desired to open the blank-mold, air under pressure is directed to a pipe $p$ from a groove 78 in the fixed portion of the valve, which parts are brought into registry by movement of the mold carrying table 5, and such air passes into an annular channel 79 in the wall of the cylinder within the sleeve 12, thence to a channel 80 leading to the front of the piston 15, to move the latter.

The outer end of the piston rod 16 carries a cross piece 81, having at its ends adjustable links 82 which are pivotally connected at 83 to the halves of the blank-mold 10, and when said piston 15 is moved as indicated, these halves will be opened, leaving the blank suspended by a neck-mold 29 pivotally mounted on the stem 10ᵃ. In this position, the mold-carrying plate 7 is in line with a cylinder 85 having a suitable piston carrying a piston rod 86. Motive fluid is admitted to said cylinder through pipes $q$ and $r$, and when admitted through pipe $q$, the piston is shifted to move the piston rod toward the molds and into contact with a pin 87; hereinafter described.

The plate 7 also carries the blow-mold 11, which may be of the usual type, comprising half sections pivotally connected together by a pin 90 whose lower end enters the plate 7. At the outer end of said plate 7 is a sliding head 91, adapted to ways 92 in said plate and having rods 93 pivotally attached at 94 to the sections of the blow-mold. The head 91 carries the pin 87 which is engaged by the end of the piston rod 86, controlled by the piston in the cylinder 85 which is mounted on the relatively fixed portion of the machine, and when these parts are in registry, said piston is operated by the proper application of air to the cylinder through the pipe $q$ to close the blow-mold.

Movable bottoms 95 are provided for the blow-molds, which bottoms may be carried by auxiliary plates 96 slidably mounted in the inner ends of the plates 7; said plates 96 having stems 97 depending in slots 98 cut in the plates 7 and table 5. These stems have rollers 99 which are engaged by cams 100 and 100ᵃ; the former moving the bottoms into position for registry with the blow-molds, while the latter move said bottoms out of such relation after a bottle has been blown.

With a bottom in place, the blow-mold is now in position for the application of air to blow the blank to finished form. For this purpose, a blow-head 101 is centered over the blow-mold; such blow-head being carried by a hollow stem 102 which is supported by a piston-rod 103 carried by a piston 104 in a cylinder 105. This piston is lowered by the application of air through a pipe $s$, being cushioned by a spring 106, and raised by air admitted through a pipe $t$. Air to blow the blank is admitted through a pipe $u$ leading from the main supply. The blow-head 101 consists of a movable sleeve portion 107 surrounding a plug 108 having cross passages 109 and a central vertical passage 110 above and communicating with the same; said passage 110 communicating with the hollow stem 102.

After the blowing of the blank to finished form, the blow-head is raised by the admission of air through the pipe $t$; the pipe $s$ being open to the exhaust, and the mold carrying member is then ready to be moved to the fourth position D; the mold being closed around the bottle. When the plate 7 reaches the fourth position, the blow-mold is opened in the following manner. The table carries a bracket 115 upon which is mounted a cylinder 116, having a piston 117, carrying a piston-rod 118; pipes $v$ and $w$ delivering air to said cylinder for the purpose of moving the piston therein. The piston rod 118 has a block 119 grooved at 120 on its under side for engagement with the pin 87, and as the plate 7 approaches the fourth position, said block is in position for the pin 87 to move into engagement therewith. Immediately thereafter, air is admitted via the pipe $v$ to the cylinder 116 for action upon the piston 117 carried by the piston-rod 118; the latter moving out the sliding head 91 having the rods 93 connected to the halves of the blow-mold, thereby opening the latter and freeing the finished bottle, which is then removed from the neck-mold.

The neck-mold is normally held in the closed position by a catch 125 held in place by a spring 126 in engagement with the rear end of the same. The boy presses against this rear end with a suitable tool, releasing the catch and simultaneously opening the mold at a single operation; the bottle being then supported by a suitable clamping device while the neck mold is opened. The bottle is then delivered to a boy for transfer to a lehr.

The blow-mold is then moved to the fifth position, E, upon the next movement of the table and allowed to cool. From the fifth position, the mold-carrying plate 7 is moved to the first position and the blank-mold is turned so as to bring it to the inverted position ready for the next charge. This turning is accomplished in a manner precisely similar to the reversal of the filled blank-mold before described; the teeth 57ᵃ of the gear wheel 55 engaging the bevel pinion 56 whereby said turning may be accomplished; being racked into the final position by the engagement of the pawl 62 with the teeth 61 of the plate 60.

To move the table, we provide a cylinder 130, having a piston 131; the latter carrying a piston-rod 132 having a plunger 133 at its opposite end which enters a dash-pot 134 to retard the final portion of the movement of the table. The piston-rod 132 has a pin 135 adapted to a slot 136 in an arm 137 carried by the hub of the table whereby the forward movement of said piston-rod may move the table; said arm having a vertically movable pin 138 which is raised into holes 139 in said table when the latter is to be moved. This pin is held in place by a spring 140, and is withdrawn by a piston-rod 141 when the arm is to be retracted for fresh movement of the table; said piston-rod having a head 142 for engagement by jaws 143 carried by the pin 138, and said parts registering when the arm 137 reaches the limit of its movement in effecting movement of the table. Air is admitted to a cylinder 144 in which is mounted a piston 145 carrying the piston-rod 141, via a pipe $y'$ to lower said piston; said piston being raised by air admitted to the cylinder via a pipe $z'$.

After the glass is dropped into the mold, the shears 19 are operated, and on the return movement of the shears, the valve 21, (Fig. 12) is tripped, allowing air to flow from the main air supply pipe $a$ through said valve and through a pipe $a'$ to one end of a valve casing 150, (Figs. 13 and 14), moving the valve 151 therein to bring its port 152 into registry with a section $a^2$ of said main air supply and a pipe $a^3$, to allow air to pass into the latter and its branches $a^4$, $a^5$ and $a^6$ leading to the under side of the equalizing valve 153, (Fig. 15), pressure cylinder 154 and one end of the valve 155, (Figs. 16 and 17). The air directed to the under side of the valve 153 raises the same, permitting air to flow from the main air supply pipe $a$ through said valve 153 and pipe $b$ to the upper end of the cylinder 25, lowering the blow-head 28 controlled thereby.

The air directed to the cylinder 154 has filled the latter; thereafter flowing through a pipe $a^7$ to the upper end of the equalizing valve 153 providing pressure on the upper side of said valve equal to the pressure on the under side of the same; the upper side of the said valve having a larger area than the under side, upon the pressure being equalized the valve is necessarily lowered. The air directed to the valve 155 shifts the same, bringing a port 156 therein into registry with a pipe $a^8$. The lowering of the equalizing valve 153, previously described, exhausts the air from the upper end of the cylinder 25 and directs air to the lower end of said cylinder through the pipe $c$ and valve 155 to one end of a valve 157, sliding the same in its casing 158, (Fig. 16), allowing air to exhaust from the lower end of the cylinders 33 and 51, (through pipe $d$), through pipe $h$ to exhaust valve 159, (Figs. 18 and 19), and the upper end of cylinder 39, (Fig. 7), through the pipe $f$ and its branches; air under pressure being admitted through a pipe $e$ and its branches to the upper ends of cylinders 33 and 51, valve 159, lower end of cylinder 39, valve 160, (Figs. 20 and 21), and cylinder 161, (Fig. 22), and through a pipe $a^9$ to other cylinders hereinafter described.

Air directed through pipe $e$ to the upper end of cylinder 33 lowers the piston 32 controlling the plug 30 with its mouth-forming pin 31. Air directed to the end of valve 159 exhausts the air from the lower end of cylinder 51; the pressure on the upper end of the piston 50 in said cylinder lowering the blow-head 45 from beneath the blank-mold, while the air directed to the lower end of the piston 38 in the cylinder 39 raises the cap 35 from the top of the blank-mold.

Air flowing through the pipe $e$ passes also to the valve 160 carried by the cylinder 162, lowering the piston 163 in said cylinder, thereby drawing the locking pin 164 out of the table. Air also flows through said valve 160 and the pipe $a^9$ to the cylinder 161, drawing the locking pin 165 out of the carrier 166 for the plugs 30, also through a branch of the pipe $a^9$ to mechanism hereinafter described. In lowering the piston in the cylinder 33, the rod 32 connected to said piston strikes a lever 168, raising a valve 169, (Fig. 23). In raising the valve 169, air is exhausted from one end of cylinders 85, 116, 130, 144 and 170, and valve 171, of the character shown in Figs. 18 and 19, via pipe Y, and its branches $q$, $v$, $y$, $y'$ and $y^2$; air under pressure being admitted to the opposite ends of said cylinders 85, 130, 144, 170 and 105, and valve 172, (Figs. 18 and 19) via pipe Z, and its branches $r$, $z$, $z'$, $z^2$ and $z^3$. Air admitted to the cylinder 144 raises its piston-rod 141 into position with its head 142 ready to pull the table moving pin 138 out of contact with the table, (Fig. 11). Air admitted to the cylinder 105 and valve 172 raises the blow-head 101 from the blow-mold 11 and moves said valve 172 so as to exhaust the air from the upper end of the cylinder 105. Air admitted to the cylinder 85 retracts the piston-rod 86 carried by the piston in said cylinder. Air admitted to the cylinders 130 and 170 serves to move the table 5 and carrier 166 simultaneously, one fifth of a revolution, bringing a fresh blank mold and a fresh plug with a mouth-forming pin in the bottom thereof, in line to receive a fresh charge of glass.

Under the influence of the air in the cylinder 130, the table moving arm 137 moves away from the valve 175, (Fig. 24), allowing the valve to be moved in its casing by the action a spring 176, thereby allowing air under pressure to flow from the pipe $a^{10}$ to a pipe $a^{11}$ through the valve 171, (Figs. 18 and 19, previously moved by the spring 177 after exhausting the air from its opposite end), to a pipe $w$, and thence to the cylinder 116 moving the piston 117 therein and the rod 118 carried by said piston into such a position that the head 119 of said rod is directly in the path of the pin 87 connected to the mechanism for opening the blow-molds.

The arm 137 also moves away from a lever 185, and the valve 160 under influence of a spring 160$^a$ moves within its casing and permits the exhaust of air from the cylinders 162 and 161, and pipe $a^9$. The air being exhausted from the cylinder 162, the lock pin 164 is raised by a spring 164$^a$ against the bottom of the table 5, directly in the path of one of the apertures 164$^b$ in the same. The air being exhausted from the cylinder 161, the lock pin 165 is raised by a spring 165$^a$ against the bottom of the carrier 166 directly in the path of one of the apertures 182 in the same. When this occurs the pipe $m$ is open to exhaust the air from the cylinder 72, carried by the blank-mold structure lying at position B, (Fig. 33). The spring 73 forces the pin 70 against the circular plate 60 in path of one of the bushings 74 carried by said plate; the pin 70 entering said bushing when the blank-mold is in the exact vertical position, locking said mold against further rotative movement.

Upon reaching the end of its travel, the table moving arm 137 strikes the stem 179 of a valve 180, (Figs. 25 and 26) admitting air from the pipe $a^{12}$ through a pipe $a^{13}$ to the opposite end of the valve casing 150, moving the valve 151 in its casing, and permitting the exhaust of the air from the valve 153, cylinder 154, and valve 155. The valve 155 is then moved by its spring 181, cutting off the air supply from the pipe $a^8$ to the valve 157; said valve 157 being moved by its spring 157$^a$, and permitting exhaust of the air from the top of the cylinders 33 and 51, valve 159, bottom of cylinder 39, and the branch of pipe $e$ leading to the valve 160, cylinders 162 and 161, and pipe $a^9$. At this point, the locking pin 164 enters an aperture 164$^b$ in the table, and the locking pin 165 enters an aperture 182 in the carrier 166. This movement of the valve 157 allows air under pressure to be admitted to the bottom of the cylinder 33, raising the piston therein; the lever 168 is then released, and the valve 169 descends. In descending, said valve 169 permits exhaust of air from one end of the cylinders 144, 170, 130, 85 and 105, and valve 172, via the pipe Z and its branches as noted above, and admits air to the opposite ends of cylinders 170, 144, 116, 130 and 85, and valve 171.

Air being admitted to one end and exhausted from the other end of the cylinder 116, the blow-mold 11, (position D), is caused to be opened. Air being admitted into one end and exhausted from the other end of the cylinder 85, the blow-mold 11, (position C), is caused to be closed around the blank previously formed in the blank-mold.

Admitting air into the upper end of the cylinder 144 and exhausting from the lower end of the same, withdraws the pin 138 from the table, and air being admitted to the end of the cylinder 130, the table moving arm 137 is returned to its normal position. Air admitted to one end and exhausted from the other end of the cylinder 170, the piston therein returns to its normal position. Air admitted to the valve 171 causes the movement of the same in its casing, (against the action of the spring 177), thereby effecting the exhaust from one end of the cylinder 116. When the table moving arm returns to its normal position, it again strikes the stem of the valve 175, admitting air to the cylinder 105 to lower the blow-head 101 over the blow-mold 11.

When retracted, the table moving arm 137 strikes the lever 185 connected to the valve 160, (Figs. 20 and 21) moving the same in its casing, and placing the ports in position for admission of air to the cylinders 162 and 161, whereby the pins 138 and 165 may be withdrawn to permit the table 5 and carrier 166 to be moved by said arm 137.

The central valve comprising the collar 75 mounted on the main stem of the machine and the movable portion 76, controls the time of opening and closing the blank-molds mounted on the plates 7 supported by the table 5 of the machine.

The operation of the machine is as follows:

Position A. The glass is dropped into the blank-mold 10, and the shears 19 are operated as before described; the plug 30 with its mouth-forming pin being already in position, the blow-head 28 descends and forces the glass down or compacts the glass into the neck-mold 29 and around said mouth-forming pin, completing the neck and mouth of the article to be blown and forming the initial cavity in the glass blank. The blow-head 28 controlled by the cylinder 25 and the plug 30 controlled by cylinder 33 are then automatically withdrawn to the inoperative position, as previously described.

The table is then turned by the cylinder 130, bringing the partially formed article into position B. In this position, a cap 35 is lowered over the blank-mold by the cylinder 39, and a blow-head 45 is brought up underneath the table by the cylinder 51, air is applied thereto, and the glass is blown up or counterblown into the blank-mold and against the cap 35 covering the same, enlarging the initial cavity already formed therein. During this operation another charge is being compacted in the succeeding mold at position A and simultaneously upon the termination of that compacting operation and the withdrawal of the pin 30, the cap 35 and the blow-head 45 are automatically withdrawn and the table is again moved by the cylinder 130 to position C. In traveling from position B to position C, the blank-mold is automatically reverted, as hereinbefore described, and the sliding bottom of the blow-mold is moved into position by the cam 100. By the reverting of the blank-mold, the finished neck of the paritally finished bottle is brought uppermost; being supported by the neck-mold 29. The pin 70 locking the blank-mold in stationary position is withdrawn by air directed from the pipe $m$, through a port 185$^a$ in the valve 75 to a cylinder 72.

When in position C, the blank-mold is opened; the partially blown article being suspended in the neck-mold, and the blow-mold is then closed around the same. Opening of the blank-mold is effected by bringing a port 186 into registry with a groove 78 in the valve 75. This allows air under pressure to pass through pipe $p$ into one end of the cylinder 12; the exhaust from the opposite end passing through pipe $p'$ to a port 188 brought into registry with an exhaust groove 189 in the valve 75. The blow-mold is closed by the cylinder 85 previously described. The blank-mold before being opened is moved into an exactly vertical position after the pinion passes out of engagement with the teeth 57 of the mutilated gear, and the pawl 62 in engagement with the teeth 61 of the disk actuated by the piston 64 in the cylinder 65 turns the blank-mold on its pivot until the locking pin 70 enters its aperture in the blank-mold carrier 60. The air employed in the cylinders 65 is supplied to the same from a groove 190 in the valve 75; ports 191 being always in registry with said groove. The air is led from these ports through valves 66, one of which is shown in section in Fig. 27, by pipes $cc$, which valves are operated at the proper time by the head 67 on the stems 66$^a$ of the same coming into contact with the fixed cam plate 68; the air after leaving said valves 66$^a$ entering pipes $l$ leading to the cylinders 65. During the final blowing at position C the charge in the succeeding blank mold at position B is being expanded to form a hollow parison and in the second succeeding blank mold at position A a new charge is being compacted.

In position C, the blow-head 101 is lowered by the cylinder 105, and raised again by the same cylinder after the operation of blowing the blank to the finished article is completed, after which the table is moved to position D.

When in position D, the blow-mold is opened by movement of the piston rod controlled by the piston in cylinder 116, and the finished article is left hanging in the neck-mold 29, which is then opened by the mold boy who takes the finished bottle out of said mold; such bottle being subsequently placed in the usual lehr. The table 5 is then moved to position E, where the molds are allowed to cool. Upon leaving this position, the blank-mold is again closed by fluid under pressure by reason of the port 188 coming into registry with the groove 189, and the port 186 coming into registry with an exhaust groove 193.

In traveling from position E to position A, in which latter position a blank-mold will be ready for a fresh charge of glass, said mold is inverted, bringing the neck-mold in the lowermost position, and simultaneously with this action, the sliding bottom of the blow-mold is moved out of position by the cam 100ª. The locking pin 70 is drawn by movement of the piston in cylinder 72 and the pinion 56 on the blank-mold contacts with a set of teeth 57ª on the fixed gear 55. As the blank-mold nears position A, the pinion 56 leaves the teeth 57ª on the gear 55 and the piston 64 within the cylinder 65 operates the pawl 62 into engagement with the teeth 61 to move the blank-mold into the vertical position. As the stem of the valve 66 leaves cam 68 in traveling from position B to position C, and from position E to position A, air to raise the piston 64 is cut off from the cylinder 65; the piston therein subsequently lowering by gravity.

From the above it will be apparent that successive charges of glass will be compacted during equal or uniform time intervals. The neck pins are withdrawn automatically thereafter and the counterblowing or expanding of the parison is initiated automatically at equal time intervals after the termination of compacting and withdrawal of the neck pins. Thus successive charges of glass are given the same or uniform treatment as to compacting, neck pin withdrawal and the initiation of counterblowing. This automaticity and uniformity in the formation of successive parisons contributes to the production of uniform articles of glassware. Moreover, the final blowing of successive parisons is initiated at equal time intervals after the termination of the counter or expanding blowing thereof, which also assists in the production of uniform articles.

This application is a continuation of our prior application Serial No. 814,728, filed January 27, 1914.

We claim:

1. In a glass working machine, the combination of a rotatable mold-carrying member, sets of cooperating blank and blow molds carried thereby, means for rotating said member to move the molds horizontally, cooperating blank and blow molds of each set being movable into closed position around a common vertical axis, means for rotating each blank mold, first to an inverted position to receive a charge of glass and then to a position to deliver a blank therefrom to a blow mold, successively operable means for blowing air at successive places in the horizontal rotation of the molds first into one end of said blank mold while in inverted position and then into the opposite end, means for opening said blank mold, means for supporting the blank when the blank mold is open, means for closing the blow mold to receive the blank, and means for blowing the blank to finished form.

2. In a glass blowing machine, the combination of a rotatable mold carrying member, sets of cooperating blank and blow molds carried thereby, means for rotating said member to move the molds horizontally, cooperating blank and blow molds of each set being movable into closed position around a common vertical axis, face plates carrying the blank molds, means for rotating said face plates to carry said blank molds, first to an inverted position to receive charges of glass and then to a position to deliver blanks therefrom to the blow-molds, means for blowing air into both ends of said molds while in inverted position at successive places in the horizontal rotation of the molds, means for opening and closing said blank molds, means for supporting each blank while the blank mold in which it was formed is opened and the cooperating blow mold is closed around said blank, means for closing the said blow mold around the blank, a bottom mold, means for automatically moving said bottom mold into registry with the blow-mold before the latter is closed, means for blowing the blank to finished form, means for opening the blow mold, and means for automatically withdrawing the bottom of said mold.

3. In a glass blowing machine, the combination of a central standard, a series of mold carrying members surrounding the same, sets of molds carried thereby movable to the closed and open positions, a fixed cylinder adapted to register with said mold carrying members, means controlled by said cylinder to open one of said molds, means for directing fluid pressure to said cylinder, and means for controlling such fluid pressure.

4. In a glass blowing machine, the combination of a central standard, a series of mold carrying members surrounding the same and rotatably movable with respect thereto, sets of molds carried thereby independently movable to closed positions around a common vertical axis, a cylinder adapted to register with said mold carrying members, and means controlled by said cylinder to close one of said molds, a second cylinder adapted to register with said mold carrying members, means controlled thereby to open one of said molds, means for supplying air to said cylinders, and means for controlling the supply of air to said cylinders.

5. In a glass blowing machine, the combination of mold carrying means rotatably mounted, means for rotating said carrying means to move the molds horizontally, a pair of molds carried by said carrying means opposite each other in radial alignment, a rotatable face-plate journaled on a horizontal axis on said mold carrying means and carrying one mold of the pair, means for rotating said face-plate to place the mold carried thereby in an inverted charging position and then to place said mold in a position to permit removal thereof from the blank enclosed thereby and the engagement of said blank by the other mold and means for blowing air into both ends of said invertible mold while in inverted position at successive places in the horizontal rotation of said mold.

6. In a glass blowing machine, the combination of a series of mold carrying elements rotatably mounted, a pair of molds carried by each of said elements and movable to closed position around a common vertical axis, means for rotating said elements to move the molds horizontally, a face-plate journaled on a horizontal axis in each of said mold-carrying elements and carrying one of said molds, means for rotating said face-plate to place the mold carried thereby in an inverted charging position and then to place said mold in position to permit its removal from a blank carried thereby and engagement of the blank by the other mold carried by said mold carrying element, means for blowing air into opposite ends of said invertible mold at successive places in the horizontal travel thereof, means for opening said invertible mold after it has been placed in the second position, a neck-mold for supporting the blank independently of said first mentioned molds, means mounted independently of the carrier for closing the second mold around the blank, means for blowing the blank to finished form, and means for automatically opening said second mold; the finished article being held by the neck-mold until removed.

7. In a glass blowing machine, a central hollow stem, a rotatable valve carried thereby, means for delivering air thereto, a plurality of mold carrying members rotatably mounted with respect to said stem, a plurality of molds mounted on said members and independently movable to the same axial position, blow-heads registering with said molds above and below the same, and fluid operated means for opening and closing said molds and operating said blow-heads.

8. In a glass blowing machine, a central hollow stem, a rotatable valve carried thereby, means for delivering air thereto, a plurality of mold carrying members rotatably mounted with respect to said stem and movable around the latter with said rotatable valve, a plurality of molds mounted opposite each other in radial alignment on each of said members and independently movable to open position and to closed position around a common vertical axis, fluid operated means for opening and closing said molds, means for imparting step-by-step rotative movement to the mold-carrying members, and means for rotating one of said molds on a horizontal axis independently of the opening and closing the same, such horizontal rotation taking place during the movement of the mold-carrying members around the central stem.

9. The combination, in a glass blowing machine, of a rotatable mold carrier, a central standard around which said carrier is movable, means for moving said carrier, a mold revoluble on a horizontal axis mounted on said carrier, a cylinder, a bearing on said carrier receiving said cylinder, a piston in said cylinder, a piston rod carried thereby and connected to said mold, said piston, rod and cylinder being revoluble with the mold in said bearing, means for supplying said piston with air when it occupies different positions in its bearing, and means for revolving said mold on its horizontal axis as the carrier is rotated.

10. In a glass blowing machine, the combination of a rotatable mold carrying member, a central vertical standard around which it is moved, a pair of molds carried thereby opposite each other and in radial alignment with respect to the axis of rotation of said carrying member, each of said molds being movable to closed position around the same axis, means for rotating one of said molds upon a horizontal axis with respect to its carrier, first to an inverted position to receive a charge of glass and then to a position to deliver a blank, to the second mold, and independent fluid-operated means for opening and closing said molds, and means for vertically centering the horizontally movable mold.

11. In a glass blowing machine, the combination of a rotatable mold carrying member, a central vertical standard around which it is moved, a pair of molds carried thereby in radial alignment with respect to the axis of rotation of said carrying member, each of said molds being movable to closed position around the same axis, a face plate mounted on said mold carrying member and supporting one of said molds, means for rotating said face plate upon a horizontal axis to carry said mold, first to an inverted position to receive a charge of glass and then to a position to deliver a blank to the second mold, independent means for opening and closing said second mold, independently operable means for supporting the blank while one mold is opened and the other closed around the blank, said face plate having a hollow hub, and a piston movable in said hub to open and close the mold carried thereby.

12. In a glass blowing machine, a central hollow stem, a rotatable valve carried thereby, means for delivering air thereto, a plurality of mold carrying members rotatably mounted with respect to said stem, a plurality of molds mounted on said members in radial alignment with respect to the axis of rotation of said member and independently movable to the same axial position, one of said molds being rotatable with respect to its carrier, and fluid operated means for opening and closing and rotating said molds controlled from said rotatable valve.

13. In a glass blowing machine, the combination of a central standard, a series of mold carrying members surrounding the same, sets of molds carried thereby movable to the closed positions around the same axis, the molds of each set being in radial alignment with respect to the axis of rotation of said member, a fixed cylinder adapted to register with said mold carrying members, means controlled by said cylinder to open one of said molds, means for directing fluid pressure to said cylinder, and a valve rotating with the mold-carrying members for controlling such fluid pressure.

14. In a glass blowing machine, the combination of a central standard, a series of mold carrying members surrounding the same and rotatable with respect thereto, sets of molds carried thereby independently movable to closed positions around the same axis, the molds of each set being in radial alignment with respect to the axis of rotation of said carrying members, a cylinder adapted to register with said mold carrying members, means controlled by said cylinder to close one of said molds, a second cylinder adapted to register with said mold carrying members, means controlled thereby to open one of said molds, means for supplying air to said cylinders, a valve rotating with said mold-carrying members for controlling the supply of air to said cylinders, and means for imparting step-by-step movement to said mold carrying members.

15. In a glass blowing machine, the combination of a hollow central standard, a plurality of mold-carrying members revoluble around the same, fluid-operated means for revolving the same, a pair of molds carried by each of said members opposite each other and in radial alignment with the axis of rotation of said members, fluid-operated means for opening and closing said molds at independent points with respect to the position of the carrying members, said molds closing about the same axis, gearing for rotating one of said molds on a horizontal axis during the movement of the mold-carrying members, a neck-mold carried with each of the mold carrying members and registering with each of the molds carried thereby, and a valve rotating around the central standard with the mold carrying members for controlling the fluid-operated means for revolving said mold carrying members and causing the opening and closing of the molds.

16. In a glass blowing machine, the combination of a blank-mold, a face-plate carrying the same, means for rotating said face-plate, said face-plate having teeth, a pawl in engagement with said teeth for imparting final movement to said face-plate to bring the mold into proper vertical position, and a fluid operated piston for actuating said pawl.

17. In a glass blowing machine, a central hollow stem, a rotatable valve carried thereby, means for delivering air thereto, a plurality of mold carrying members rotatably mounted with respect to said stem and movable with said valve, a plurality of molds mounted on said members in radial alignment with respect to the axis thereof and independently movable to the same axial position, blow-heads registering with said molds above and below the same, and fluid operated means for opening and closing said molds and operating said blow-heads.

18. In a glass blowing machine, a central hollow stem, a rotatable valve carried thereby, means for delivering air thereto, a plurality of mold carrying members rotatably mounted with respect to said stem and movable with said valve, a pair of molds mounted on each of said members opposite each other and in radial alignment with respect to the axis of rotation thereof and independently movable to a closed position around the same axis, fluid operated means for opening and closing one of said molds controlled from said rotatable valve, means for imparting step-by-step rotative movement to the mold-carrying members, gearing for rotating one of said molds on a horizontal axis during the movement of the mold-carrying members, a hollow hub forming part of said horizontally rotatable mold operating structure, and a piston in said hub for opening and closing said mold.

19. The combination, in a glass blowing machine, of a rotatable mold carrier, means for moving the same, a central standard around which said carrier is movable, a horizontally revoluble mold mounted on said carrier, a support for said mold having a hollow hub forming a cylinder, a piston in said cylinder, a piston rod carried thereby and connected to said mold, gearing for rotating said cylinder during the movement of the mold carrier, and means for supplying said cylinder with air when in its different positions due to rotation.

20. In a glass blowing machine, a circular series of blank molds, neck molds associated with the blank molds, a circular series of blow molds, said blank molds being independently movable to closed position in axial alignment with the neck molds, said series of blank molds being adapted to successively receive charges of glass, power connections for closing said blank molds and blow molds, means for shearing such charges, means for compacting the sheared charges in the molds, connections for rendering said means effective in predetermined timed relation to a shear movement without intervention of the operator, means operable thereafter and in predetermined timed relation thereto for causing air in sufficient volume and amount to recess a charge of compacted glass in a blank mold, to blow the same to substantially hollow form, a closure for effectively closing the opposite end of the mold during the recessing operation, and means for applying the closure to the mold in predetermined timed relation to a movement of the shearing means.

21. In a glass blowing machine, the combination of mold carrying means rotatably mounted, pairs of molds carried thereby the molds of each pair being opposite each other and in radial alignment with respect to the axis of rotation of said mold carrying means, a face-plate on each of said elements carrying one mold of each pair of said molds, each of said face plates having a hollow hub forming a cylinder, a piston in said cylinder, a piston rod carried thereby and connected to said mold, gearing for rotating said face-plates on horizontal axes to place the molds carried thereby in an inverted charging position and then to place said molds in position to permit removal of the blanks carried thereby, and means for locking said face-plates when the molds carried thereby are in their respective vertical positions.

22. The combination, in a glass blowing machine, of a rotatable mold carrier, a central standard around which said carrier is movable, means for moving said carrier, a horizontally revoluble mold mounted on said carrier, a cylinder on said carrier, the latter having a bearing therefor, a piston in said cylinder, a piston rod carried thereby and connected to said mold to open and close the same, said piston, rod and cylinder being revoluble with the mold, means for supplying said cylinder with air, a valve controlling such supply revoluble with the mold carrier around the central standard, said valve having passages which are alternately open to pressure and exhaust as said carrier is rotated, gearing operable when the mold carrier is rotated to move the horizontally revoluble mold, and means for centering said mold in its operative vertical positions.

23. The combination, in a glass blowing machine, of a rotatable mold carrier, a central standard around which said carrier is movable, fluid operated means for rotatably moving said carrier, a horizontally revoluble mold mounted on said carrier, a face plate having a hollow hub forming a cylinder journaled on said carrier and carrying said horizontally revoluble mold, a piston in said cylinder, a piston rod carried thereby and connected to said mold, the latter being opened and closed by the movement of said rod, said piston, rod and cylinder being revoluble with the mold, means for supplying said cylinder with air in its different positions, the bearing being grooved for the purpose, a valve controlling such supply revoluble around the central standard, said valve having passages which are alternately open to pressure and exhaust as said carrier is rotated, gearing automatically operated upon movement of the mold carrier for revolving said mold, means for centering said mold in its respective vertical positions, and means adapted to engage the opposite ends of said mold to shape a charge of glass therein.

24. In a glass blowing machine, the combination of a series of mold-carrying elements rotatably mounted, means for effecting horizontal rotation thereof, pairs of molds carried by said elements, face plates mounted on horizontal axes carrying one of each pair of said molds, means for rotating said face plates to place the molds carried thereby in an inverted charging position and then to place said molds in position to permit opening of the same free of the blanks and closing of the other mold of the pair around said blanks, means effective at different positions in the horizontal rotation of said invertible molds for blowing air into the opposite ends thereof while in inverted position, means for supporting said blanks during the mold changing, and means for opening and closing said blank-receiving molds, molds of each pair closing around the same vertical axis.

25. In a glass blowing machine, the combination of rotatable mold carrying members, pairs of molds carried thereby opposite each other and in the radial alignment with respect to the axis of rotation of said member, each of said pairs of molds being movable into the closed position around the same axis, a plurality of vertically movable mouth-forming pins for successive cooperation with one of each pair of said molds, said pins being operable below the mold, means for moving said pins into the neck end of one of said molds, a pin carrier, and means for rotating said pin carrier on a vertical axis beneath the mold carrying members.

26. In a glass blowing machine, the combination of a rotatable mold carrying member, a pair of molds carried thereby in radial alignment with respect to the axis of rotation of said member, said molds being disposed opposite each other and movable into closed position around the same vertical axis, a face plate mounted on said carrier and supporting one of said molds, gearing for rotating said face plate to carry said mold, first to an inverted position to receive a charge of glass and then to a position to deliver a blank to the other mold, a mouth forming pin for cooperation with said invertible mold when in the charging position, means for moving said pin, and means for imparting final movement to the face plate to vertically center the mold carried thereby.

27. In a glass blowing machine, the combination of a rotatable member, a plurality of pairs of sectional molds disposed opposite each other in radial alignment carried thereby, the molds of each pair being movable into closed position around a common vertical axis, means for rotating one mold of each pair, first to an inverted position to receive a charge of glass and then to a position to deliver a blank therefrom to a blow-mold, fluid actuated means for opening and closing said blank-carrying molds, a neck-mold cooperating with the blank-mold and serving to support the blank when the blank-mold is opened, means for closing the other molds of each pair around the blank, means for blowing the blank to finished form, and means for releasing the bottle from the neck-mold.

28. In a glass blowing machine, the combination of a central standard, a series of mold carrying members rotatable about the same, sets of molds carried thereby movable to the closed and open positions, a plurality of fixed cylinders adapted to independently register with said mold carrying members, means controlled by one of said cylinders to close one of said molds, means controlled by another cylinder to open one of said molds, means for directing fluid pressure to said cylinders, and means for controlling the passage of such fluid pressure.

29. In a glass blowing machine, the combination of a central standard, a mold carrying member revoluble around the same, fluid-operated means for revolving said carrier, a pair of molds carried by said member opposite each other in radial alignment and adapted to close around a common vertical axis, one of said molds being movable on a horizontal axis, fluid operated means for opening and closing said molds, means for rotating one of said molds on its horizontal axis, said mold being in half sections, a pin forming a journal for said sections, and a sectional neck-mold journaled on said pin and adapted to register with both of said molds, said neck-mold being independently movable to open and closed positions.

30. In a glass blowing machine, the combination of a rotatable mold carrying member, a central vertical standard around which it is moved, a pair of molds carried by said member in radial alignment with respect to the axis of rotation of said carrying member and on the same plane, each of said molds being movable to closed position around a common vertical axis, a face plate mounted on said mold carrying member and supporting one of said molds, means for rotating said face plate upon a horizontal axis to carry said mold, first to an inverted position to receive a charge of glass and then to a position to present a blank in proper position for reception by the second mold, independent means for opening and closing said second mold, a neck-mold cooperating with both molds for supporting the blank while one mold is opened and the other closed around the blank, said face plate having a hollow hub constituting a cylinder, and a piston movable in said cylinder to open and close the mold carried by said face plate.

31. In a glass blowing machine, the combination of a series of mold-carrying elements rotatably mounted, pairs of cooperating blank and blow molds carried thereby, a neck mold associated with each blank mold, the molds of each pair being movable to closed position around the axis of the neck-mold, a rotatable head carrying one of each pair of molds, piston rods for operating said last mentioned molds, said piston rods having their longitudinal axes coinciding with the axes of rotation of said rotatable heads, gearing effective when the mold-carrying elements are moved for rotating said rotatable heads to place said molds in an inverted charging position and then to place said molds in position to permit the removal of the blanks carried thereby, fluid pressure means for moving said piston rods to open said molds when they have been rotated to a predetermined position, and fluid operated means for moving the blow molds into cooperative relation to the blanks formed in the blank molds.

32. In a glass blowing machine, the combination of a series of mold-carrying elements rotatably mounted, pairs of cooperating blank and blow molds carried thereby, a neck mold associated with each blank mold, the molds of each pair being movable to closed position around the axis of the neck mold, a rotatable head carrying one of each pair of molds, piston rods for operating said last mentioned molds, said piston rods having their longitudinal axes coinciding with the axes of rotation of said rotatable heads, gearing effective when the mold-carrying elements are moved for rotating said rotatable heads to place the molds in an inverted charging position and then to place said molds in position to permit the removal of the blank carried thereby, means for compacting the glass in said molds while in charging position, fluid pressure means for moving said piston rods to open said molds when they have reached said second position, and fluid operating means for moving the blow molds of each pair into cooperative relation to the blanks formed in the blank molds.

33. In a glass blowing machine, the combination of a series of mold-carrying elements rotatably mounted, pairs of cooperating blank and blow molds carried thereby, a neck mold associated with each blank mold, the molds of each pair being movable to closed position around the axis of the neck-mold, a rotatable head carrying one of each pair of molds, piston rods for operating said last mentioned molds, said piston rods having their longitudinal axes coinciding with the axes of rotation of said rotatable heads, gearing effective when the mold-carrying elements are moved for rotating said rotatable heads to place said blank molds in an inverted charging position and then to place said molds in position to permit the removal of the blanks carried thereby, means cooperating with said blank molds while in inverted position for blowing the blank upwardly therein, fluid pressure means for moving said piston rods to open said blank molds when they have reached said second position, and fluid operated means for moving the blow molds of each pair into cooperative relation to the blanks formed in the blank molds.

34. In a glass blowing machine, a blank mold, a blow mold, a member carrying said molds and rotatably mounted to bring said molds to a plurality of different stations, means for charging said blank mold at one of said stations, means for subjecting the upper end of the charge of glass in said blank mold to air pressure at said station to compact the glass, means for moving said member to another station, means for subjecting the opposite end of the charge of glass in said blank mold to air pressure at such other station to form a blank, power connections acting automatically to invert the blank and transfer it to the blow mold and means for finishing the articles in the blow molds, substantially as described.

35. In a glass blowing machine, a plurality of pairs of molds, each pair comprising a blank mold and a blow mold, members carrying said molds and rotatably mounted to bring said molds to a plurality of different stations, means for shearing charges of glass for successively charging the blank molds at one of said stations, means for subjecting the upper end of the charge of glass in each of said blank molds to air pressure at said station to compact the glass, means for moving said members to bring the charged mold to another station, means for subjecting the opposite end of the charge of glass in each of said blank molds to air pressure at such other station to form the same, power connections acting automatically to invert the blank and transfer it to the blow mold and means for finishing the articles in the blow molds, substantially as described.

36. In a glass working machine, the combination with a movable table, molds comprising relatively movable parts carried by said table, a reciprocable table actuator, a primary air valve shifted by said actuator, a pneumatically operated secondary air valve controlled by the primary air valve, air pressure motors controlled by the secondary valve and connections between said air pressure motors and the molds.

37. In a glass working machine, the combination with a movable table, molds comprising relatively movable parts carried by said table, a reciprocable table actuator, a primary air valve shifted by said actuator, a pneumatically operated secondary air valve controlled by the primary air valve, an air pressure motor controlled by the secondary valve, and connections between said air pressure motor and a mold.

38. In a glass working machine, the combination of a movable table carrying relatively movable parts, a table actuator, a reciprocating air motor therefor, air-flow controlling means arranged to be actuated at opposite ends of the strokes of the table drive, air motors, connections between said motors and movable parts of the machine, pneumatically operated secondary valves for controlling said air motors, and air passages between said secondary valves and the air-flow controlling means.

39. In a glass working machine, a plurality of blank molds and associate neck molds, a substantially horizontally traveling member carrying said molds and movably mounted to bring the same to a plurality of different stations, the neck molds being mounted on and attached to said member, said member being adapted to present each mold in inverted position at a charging station, means for supplying fluid pressure to the upper end of a mold at the charging station to compact the glass into the neck end of the mold, closing means at another station for the bottom ends of the molds, means at such other station acting automatically at a predetermined time interval after each operation of the compacting means for supplying fluid pressure to a mold having said closing means in operative relation thereto to form a hollow parison therein, a plurality of blow molds, means at still another station for finish-blowing the parisons in the blow molds, and automatic means for turning the parisons neck end upwardly after the glass has been compacted therein and before the finish-blow.

40. In bottle forming apparatus, the combination of a series of parison molds each comprising a body blank mold and a neck mold for forming the neck of a bottle, said blank molds having open bottoms to successively receive charges of glass, means for supporting said parison molds in inverted position while receiving said charges of glass, means for mounting said neck molds and attaching them to the supporting means, a single shear mechanism for shearing said charges, means for compacting the charges in said parison molds and to form initial blow openings therein, closure means for said charge openings, means for applying said closure means after the charges are compacted, means for successively blowing air through said blow openings in sufficient volume and pressure to blow the glass in the body molds to hollow form and form blanks therefrom, connections operating said blowing means automatically in timed relation to a movement of the shear mechanism, and to the operations of said compacting means, means to open each body blank mold leaving the bare hollow blanks supported by the associated neck mold, a series of finishing molds, and automatic means for successively transferring the blank to the finishing molds.

41. In apparatus for manufacturing hollow glassware in combination, a series of parison molds each comprising a body mold and a neck mold, said body molds having open bottoms to successively receive charges of glass, means for supporting said parison molds in inverted position while receiving said charges of glass, a single shear mechanism for shearing said charges, means for compacting the charges in said parison molds, means for forming initial blow openings therein, closure means for said charge openings, means for blowing air through said blow openings to counterblow the glass in the parison molds and form blanks therefrom, power connections operating said compacting and counterblowing means, automatic timing means to initiate counterblowing of each charge in timed relation to a movement of the shear mechanism and to the operations of said compacting means on that charge and for causing a compacting operation to take place in one parison mold during at least a portion of the time that counterblowing of a preceding charge takes place in another parison mold, automatic means to open such blank mold leaving the bare hollow blank supported by the associated neck mold, a series of finishing molds, and automatic means for successively transferring the blanks to the finishing molds.

42. A rotary narrow neck glassware forming machine comprising a series of blank molds adapted to be successively charged with glass from above, a series of blow molds, carrying means for rotating the blank molds past separated points at which charge compacting, counterblowing, and transferring are initiated, motive power means for driving the carrying means to move the blank molds successively past such points, blank forming mechanisms for cooperating with the blank molds including compacting, neck pin, counterblowing and baffle plate mechanisms, transfer mechanisms, motive power means for actuating said blank forming and transfer mechanisms, means for timing the operation of said motive power means to move the neck pin mechanism to operative position prior to charging and to thereafter withdraw the pin mechanism from contact with the charges at the end of equal time intervals after compacting thereof; to compact successive charges of glass in successive blank molds throughout equal time intervals to partially shape the charges; to apply the baffle plate mechanism and to initiate counterblowing of such charges in the closed molds against the plate mechanism at equal time intervals after the termination of the compacting operations on said charges respectively; and to transfer the counterblown charges respectively to the blow molds at equal time intervals after the termination of counterblowing operations thereon, motive power means for inverting the charges successively and at equal time intervals prior to transfer thereof, and power means for applying blowing air to said counterblown charges in the blow molds.

43. Organized glass working machinery comprising a series of blank molds and associated neck molds, shear mechanism for shearing descending glass to form mold charges, means for successively and sequentially establishing a cooperative charging relationship between said shear mechanism and said series of blank molds in a definite predetermined order and time so that successive charges of glass may be delivered successively to said series of blank molds in sequence, means for successively and sequentially applying pressure throughout equal intervals of time to said glass charges to compact the same in successive blank and neck molds, means operative at equal time intervals thereafter for successively and sequentially counter-blowing the compacted charges into hollow parisons while confined in the blank molds and while succeeding charges of glass are being compacted in succeeding blank molds, a series of finishing molds, power means acting automatically for successively and sequentially opening and closing said blank and finishing molds to transfer the parisons to the finishing molds, and means for successively and sequentially blowing the parisons to final form in the finishing molds.

44. Organized glass working machinery comprising a series of blank molds and associated neck molds, shear mechanism for shearing descending glass to form mold charges, means for successively and sequentially establishing a cooperative charging relationship between said shear mechanism and said series of blank molds in a definite predetermined order and time, so that successive charges of glass may be delivered successively to said series of blank molds in sequence, means for successively and sequentially applying pressure throughout equal intervals of time to said glass charges to compact the same in successive blank and neck molds, means operative at equal time intervals thereafter for successively and sequentially counter-blowing the compacted charges into hollow parisons while confined in the blank molds and while succeeding charges of glass are being compacted in succeeding blank molds, a series of finishing molds, power means acting automatically for successively and sequentially inverting the parisons and transferring them to said finishing mold, and mean operative at equal intervals of time following the termination of the counter-blowing of the parisons for successively and sequentially blowing the parisons to final form in the finishing molds.

45. Organized glass working machinery comprising a series of blank molds and associated neck molds, shear mechanism for shearing descending glass to form mold charges, means for moving said series of blank and neck molds in a predetermined order and throughout equal intervals of time to successively and sequentially establish a cooperative charging relation between said shear and series of molds, means for successively and sequentially establishing fluid pressure differential on opposite ends of the charge of glass to compact it in the blank and neck molds, means for closing the open ends of the blank molds, and means operative at a different position in the travel of said molds and at equal time intervals following the compacting of the charges for successively and sequentially counter-blowing the compacted charges while confined in said blank molds, and while succeeding charges of glass are being compacted in succeeding blank molds, a series of finishing molds, power means acting automatically for successively and sequentially opening and closing said blank and finishing molds to transfer the parisons to the finishing molds, and means for successively and sequentially blowing the parisons to final form in the finishing molds.

46. Organized glass working machinery comprising a series of blank molds and associated neck molds, shear mechanism for shearing descending glass to form mold charges, means for moving said series of blank and neck molds in a predetermined order and throughout equal intervals of time to successively and sequentially establish a cooperative charging relation between said shear and series of molds, means for successively and sequentially establishing fluid pressure differential on opposite ends of the charges of glass to compact them in the blank and neck molds, means for closing the open ends of the blank molds, and means operative at a different position in the travel of said molds and at equal time intervals following the compacting of the charges for successively and sequentially counter-blowing the compacted charges while confined in said blank molds, and while succeeding charges of glass are being compacted in succeeding blank molds, a series of finishing molds, power means acting automatically for successively and sequentially inverting the parisons and transferring them to said finishing molds, and means operative at equal intervals of time following the termination of the counter-blowing of the parisons for successively and sequentially blowing the parisons to final form in the finishing molds.

47. In bottle forming apparatus, the combination of a carrier having a circular series of parison molds mounted thereon and attached thereto, each comprising a body blank mold and a neck mold at one end thereof for forming the neck of a bottle, the ends of said body molds opposite the neck molds being open to receive charges of glass successively, means for rotating said carrier, means for shearing the glass charges, operating connections therefor, means for compacting the charges in the parison molds and to form initial blow openings therein, closure means for said charge openings, connections for applying said closure means to each mold in timed relation to a movement of the shearing means, means for automatically blowing air successively through said blow openings in timed relation to shear movements and at regular time intervals after compacting the charges and in sufficient volume and pressure to blow the glass in the body mold to hollow form and form blanks therefrom, power means to open the body blank molds leaving the bare hollow blanks supported by the neck molds, a series of finishing molds and power means for closing the finishing molds about the blanks supported by the neck molds.

48. The combination of a mold carriage, molds thereon open at one end to receive charges of molten glass, means to rotate the carriage step by step to bring the molds to different stations, a blowing head at one station, means for moving said head into engagement with the charge opening of a mold and blowing air under pressure on the charge in the mold, a closure for said charge opening at a succeeding station, a second blowing head to supply air under pressure at the opposite end of the mold while the charge opening is closed by said closure and effect an initial blowing of the parison to blow the glass in said mold to hollow form and partially form the bottle, finishing molds supported in upright position, power means for automatically transferring the parisons to the finishing molds in upright position, and means for supplying air under pressure to blow the parisons in the finishing molds.

49. In a machine for forming glassware, the combination with a rotary mold carriage, of sets of molds thereon, each comprising a body blank mold, a neck mold and a finishing mold, each pivotally connected to the carriage, means for rotating the carriage step by step whereby each set of molds is brought to a number of mold stations successively, said body blank molds being adapted to have charges of glass supplied thereto at a charging station, means to supply air under pressure at the charge receiving ends of the blank molds for compacting the charges in the body molds and neck molds, means for blowing the blanks to hollow form in the blank molds at a station beyond the charging station, means operable at a succeeding station to release the body molds from the blanks and transfer the latter while supported in the neck molds to the blow molds, and means operable after the transfer of the blanks for blowing the blanks in the finishing molds, all of said operations being effected automatically and concurrently on charges or articles in different stages of development at the several stations.

50. In an organized machine for making glass containers, shear mechanism arranged to sever descending glass above the level of an inverted mold, a series of parison molds providing spaced inverted cavities into which the sheared mold charges are fed in a certain predetermined order, neck ring molds for said parison molds, mouth forming pin mechanism arranged to close the mouth ends of the parison cavities when the glass charges are packed therein, means for establishing a fluid pressure differential in the opposite ends of a charged parison mold to pack the charge therein and form the mouth of the container around the mouth forming pin and for thereafter applying fluid pressure of sufficient volume and pressure to blow the packed charge into a parison in the parison mold, means for closing the bottom ends of the parison molds so that the glass charges are confined during the parison blow, connections arranged to bring the shear mechanism and the parison molds into cooperative charging relation in said predetermined order, connections arranged for establishing said fluid pressure differential in each parison mold and for thereafter applying said fluid pressure to blow the packed charge into a parison in each parison mold in predetermined time relation to each other and to a movement of the shear mechanism for the charge therein, connections arranged to turn the parisons neck end up, fluid pressure means for opening the parison molds, a series of finishing molds adapted to receive the neck end up parisons from the parison molds, stationarily positioned cylinders coacting with said finishing molds at predetermined stations, and means for blowing the parisons to final form in the finishing molds.

51. In a glass working machine, a plurality of parison molds, a plurality of blow molds, shear mechanism arranged to sever descending glass above the level of an inverted parison mold, said parison molds providing spaced cavities and being adapted to be maintained in inverted position during the charging of glass into the same, mouth forming pin mechanism arranged to close the mouth ends of the parison cavities when glass charges are packed therein, means for effecting a packing of the glass around said mouth forming pin mechanism, means for subsequently blowing the packed charges to hollow form, means for confining the charges during the blowing to hollow form, connections arranged to bring the parison molds and the shear mechanism into cooperative relation for charging the parison molds in the desired order, fluid pressure means adapted to open the parison molds to permit transfer of the blown parisons, fluid pressure cylinders positioned at predetermined stations and adapted to cooperate with the blow molds, and means for finish blowing the parison in the blow molds.

52. In a glass working machine, a plurality of parison molds, a plurality of blow molds, shear mechanism arranged to sever descending glass above the level of an inverted parison mold, said parison molds providing spaced cavities and being adapted to be maintained in inverted position during the charging of glass into the same, mouth forming pin mechanism arranged to close the mouth ends of the parison cavities when glass charges are packed therein, means for effecting a packing of the glass around said mouth forming pin mechanism, means for subsequently blowing the packed charges to hollow form, means for confining the charges during the blowing to hollow form, connections arranged to bring the parison molds and the shear mechanism into cooperative relation for charging the parison molds in the desired order, fluid pressure means adapted to open the parison molds to permit transfer of the blown parisons, fluid pressure cylinders positioned at predetermined stations and adapted to cooperate with the blow molds, means for inverting the parisons to neck end up position before transfer, and means for finish blowing the parisons in the blow molds.

53. In machinery for making glass containers, a single shear mechanism arranged to sever descending glass above the level of an inverted mold, a series of parison molds providing spaced inverted cavities into which the sheared mold charges are fed in a certain predetermined order, separate neck molds mounted for cooperation with the parison molds, mouth forming pin mechanism arranged to close the mouth ends of the parison forming cavities when the glass charges are packed therein, means for establishing a fluid pressure differential in the opposite ends of a charged parison mold to pack the charge therein and form the mouth of the container around the mouth forming pin and for thereafter applying fluid pressure of sufficient volume and pressure to blow the packed charge into a parison in the parison mold, means for closing the bottom ends of the parison molds so that the glass charges are confined during the parison blow, connections arranged to bring the shear mechanism and the parison molds into cooperative charging relation in said predetermined order, power connections arranged for automatically establishing said fluid pressure differential in each parison mold and for thereafter automatically applying said fluid pressure to blow the packed charge into a parison in said parison mold in prearranged order and in predetermined time relation to each other and to a movement of the shear mechanism for the charge therein, connections arranged to invert the parisons automatically, a series of finishing molds adapted to receive the parisons from the parison molds, and means for blowing the parisons to final form in the finishing molds.

54. In machinery for making glass containers, a circular series of parison molds, shear mechanism arranged to sever descending glass in a predetermined plane above the level of each of said series of parison molds while inverted, a rotary carrier supporting said series of parison molds, connections for opening and closing said parison molds in predetermined timed relation to a shear movement, separate neck molds one for each parison mold and adapted to cooperate successively with a parison mold and a finishing mold, supports cooperating with the rotary carrier adapted to support each neck mold below and in cooperative relation with a parison mold at the shearing station and to support each neck mold and its parison after opening of its parison mold and before engagement of the parison by a finishing mold, mouth forming pin mechanism arranged to project into the neck molds and close the mouth ends thereof and limit the downward flow as the glass charges descend therein, blow head mechanism arranged to engage the upper end of an inverted parison mold to pack the charge therein and form the mouth of the container around the mouth forming pin, connections arranged to apply and remove said blow head mechanism in timed relation to a movement of the shear mechanism for the charge, means for applying pressure to the mouth end of the parison molds to form parisons, movable closure means for the bottom ends of the parison molds to confine the glass charges during the parison blow, connections arranged to rotate the carrier to bring the successive parison molds into cooperative relation to the shear mechanism in a predetermined order, connections for withdrawing the mouth forming pin mechanism from the mouth ends of the neck molds in timed relation to a shear movement, and to movement of the packing blow head mechanism and for applying parison blowing pressure to the mouth ends of the parison molds in timed relation to a shear movement, confining of the charge, packing the glass, and withdrawal of the mouth forming pin mechanism, connections arranged to invert the neck molds and bring the parisons supported thereby into upright position for reception by the finishing molds, a circular system of finishing molds arranged to receive the inverted parisons from the parison molds, connections for opening and closing the finishing molds, and blow head mechanism for blowing the parisons to final form in the finishing molds.

55. Organized machinery of the character defined by claim 54 characterized by said connections being fluid pressure operated.

BENJAMIN T. HEADLEY.
PARKE H. THOMPSON.